(12) United States Patent
Katase

(10) Patent No.: US 7,354,158 B2
(45) Date of Patent: Apr. 8, 2008

(54) TRANSMISSION-TYPE SCREEN AND PROJECTION-TYPE DISPLAY DEVICE

(75) Inventor: Makoto Katase, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 319 days.

(21) Appl. No.: 11/078,490

(22) Filed: Mar. 14, 2005

(65) Prior Publication Data
US 2005/0206852 A1    Sep. 22, 2005

(30) Foreign Application Priority Data
Mar. 19, 2004    (JP)    ............................. 2004-081607

(51) Int. Cl.
  G03B 21/22    (2006.01)
  G03B 21/56    (2006.01)
  G03B 21/60    (2006.01)
(52) U.S. Cl. ..................... 353/77; 359/452; 359/460
(58) Field of Classification Search ................. 353/77, 353/78; 359/443, 452, 460; 219/121.6
See application file for complete search history.

(56) References Cited

U.S. PATENT DOCUMENTS

| | | | | |
|---|---|---|---|---|
| 3,578,841 A | * | 5/1971 | Elmer ........................ 359/457 |
| 4,172,219 A | * | 10/1979 | Deml et al. ............... 219/121.6 |
| 4,730,897 A | * | 3/1988 | McKechnie et al. ........ 359/452 |
| 5,247,390 A | * | 9/1993 | Hed ........................... 359/599 |
| 6,359,732 B1 | * | 3/2002 | Yoshimura .................. 359/460 |
| 6,449,089 B1 | * | 9/2002 | Moshrefzadeh et al. .... 359/454 |
| 6,899,433 B2 | * | 5/2005 | Veligdan ...................... 353/37 |
| 2003/0210443 A1 | * | 11/2003 | Kawai et al. ................. 359/15 |
| 2004/0246578 A1 | * | 12/2004 | Shikama et al. ............ 359/457 |
| 2005/0206854 A1 | * | 9/2005 | Katase ......................... 353/79 |
| 2005/0280784 A1 | * | 12/2005 | Katase et al. ................. 353/94 |

FOREIGN PATENT DOCUMENTS

JP    A 05-040318    2/1993

* cited by examiner

Primary Examiner—Melissa Jan Koval
(74) Attorney, Agent, or Firm—Oliff & Berridge PLC

(57) ABSTRACT

Exemplary embodiments provide a transmission-type screen and a projection-type display device, which are superior in contrast. Exemplary embodiments provide a transmission-type screen characterized by including a display plane; a front side layer; and a backside layer having a light-directivity to a light projected from a direction slanted at a predetermined angle with respect to the front side layer thereof, an image being displayed on the display plane when a light is projected from a backside of the screen.

14 Claims, 24 Drawing Sheets

F I G. 17
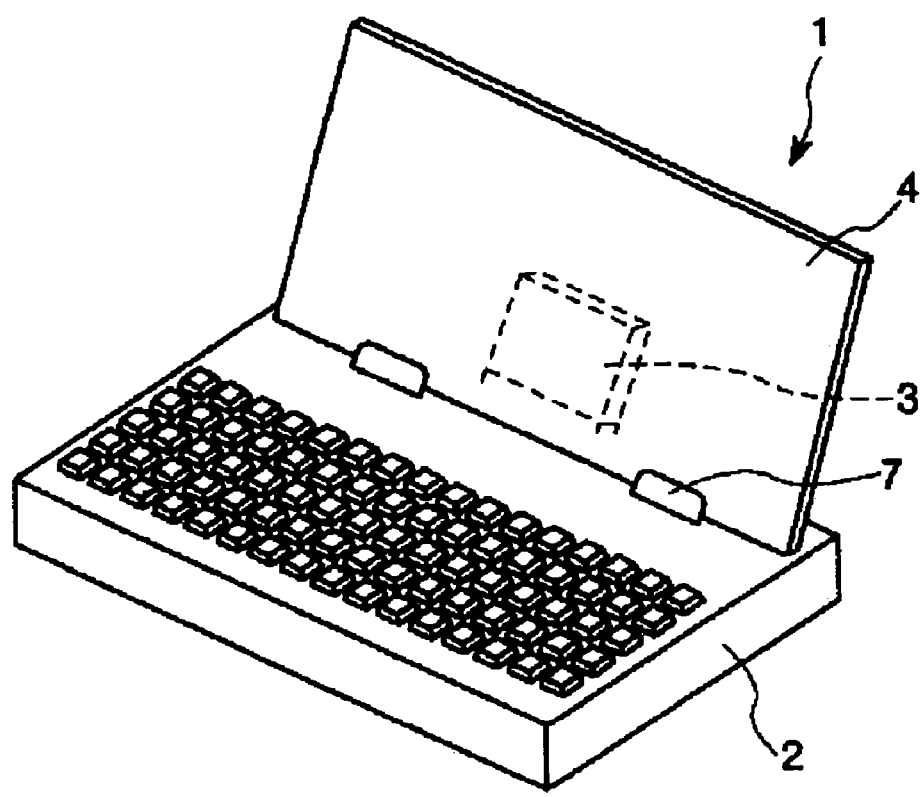

F I G. 19
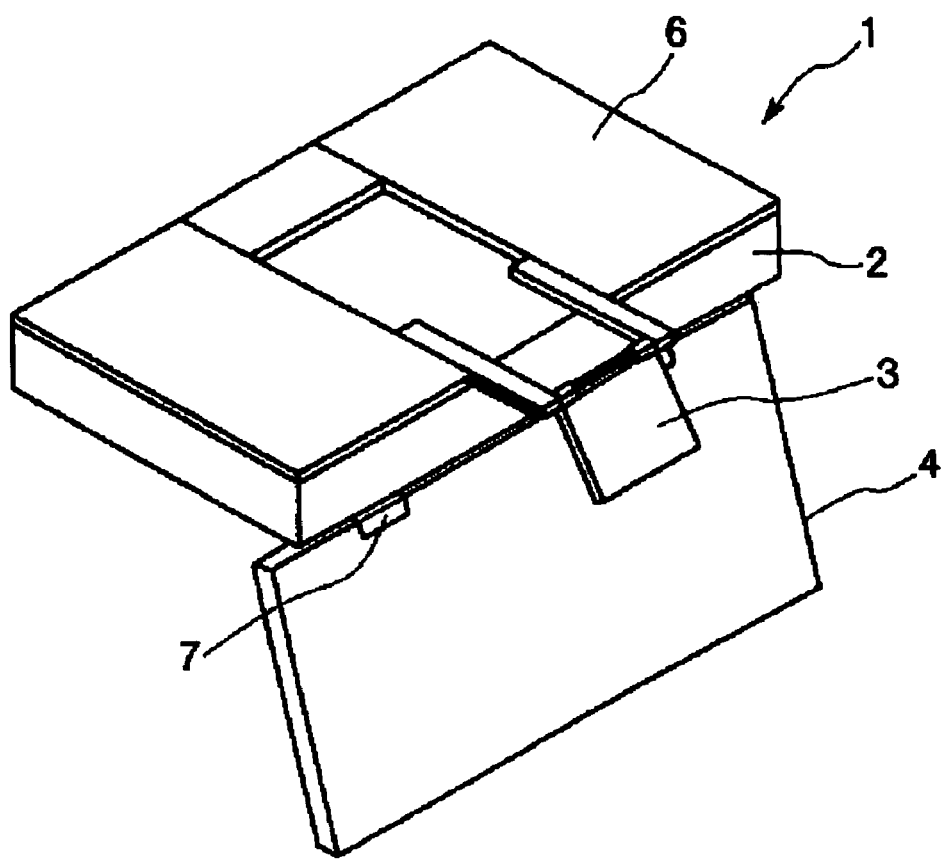

F I G. 20
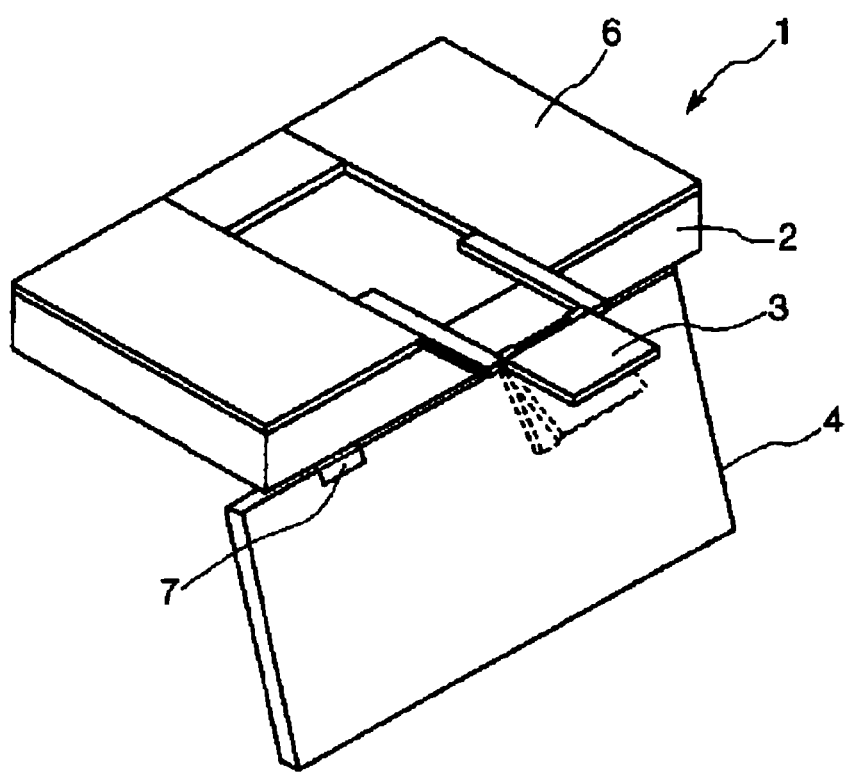

TRANSMISSION-TYPE SCREEN AND PROJECTION-TYPE DISPLAY DEVICE

BACKGROUND

Exemplary embodiments of the present invention relate to a transmission-type screen and a projection-type display device.

The related art includes projection-type display devices such as the device described in related art document JP-A-05-40318. More specifically, a related art projection-type display device includes a projecting unit, a cabinet to accommodate its optical system (including a lens, and a mirror), and a transmission-type screen mounted on the cabinet, with the projecting unit being removably mounted on a part of the cabinet. In rear system projection, the projecting unit located to the left in the cabinet is used. Projection light coming from the projecting unit passes through the optical system in the cabinet to be projected onto the transmission-type screen, whereby a display image appears on the transmission-type screen. In the projection-type display device, the cabinet covers the backside of the screen to block extraneous light coming from its ambiance which could impinge on the screen when the device is used for rear system projection. Accordingly, this can suppress the influence of the extraneous light, thereby enhancing a display image in contrast and thus, forming a clear video image on the screen. Therefore, a related art projection-type display devices has a cabinet as its essential constituent element in order to ensure the contrast of an display image like that.

However, related art projection-type display devices have a problem such that such cabinet upsizes the devices and thus, the devices need a wide space to place them in.

SUMMARY

Exemplary embodiments of the invention provide a transmission-type screen and a projection-type display device which are superior in contrast.

Exemplary embodiments provide a transmission-type screen characterized by including: a display plane; and a backside layer having a light-directivity to a light projected from a direction slanted at a predetermined angle with respect to the display plane, wherein an image is displayed on the display plane when a light is projected from a backside of the screen.

This allows the screen to accept primarily a light projected from a direction slanted at a predetermined angle with the backside layer and to desirably block other light coming from a direction other than the slanted direction. Thus, it becomes possible to focus an image superior in contrast onto the screen.

It is preferable that the transmission-type screen of exemplary embodiments of the invention further include a front side layer formed on a light-output side of the backside layer.

In regard to the transmission-type screen of exemplary embodiments of the invention, it is preferable that the front side layer has belt-like light-absorbing layers provided thereon in parallel at predetermined intervals for absorbing a light from a predetermined direction.

This allows the screen to absorb a light from the predetermined direction. Thus, it becomes possible to focus an image superior in contrast onto the screen.

In regard to the transmission-type screen of exemplary embodiments of the invention, it is preferable that the front side layer has a plurality of small reentrants and protrusions formed on a display plane side thereof.

This makes it possible to focus an image superior in contrast onto the screen.

Exemplary embodiments further provide a transmission-type screen characterized by including: a display plane; a backside layer; a front side layer formed on a light-output side of the backside layer; and a plurality of small reentrants and protrusions formed on a display plane side of the front side layer. Accordingly, an image is displayed on the display plane when a light is projected from a backside of the backside layer. This makes it possible to focus an image superior in contrast onto the screen.

It is preferable that the transmission-type screen of exemplary embodiments of the invention further include a light-absorbing layer for absorbing a light provided on protrudent portions of the plurality of small reentrants and protrusions. This makes it possible absorb a light coming from the display plane side.

It is preferable that the transmission-type screen of exemplary embodiments of the invention further include a light-absorbing layer for absorbing a light provided on inner side surfaces of the plurality of small reentrants and protrusions. This makes it possible to surely absorb a light with the inner side surfaces of the plurality of reentrants and protrusions.

It is preferable that the transmission-type screen of exemplary embodiments of the invention further include a light-diffusing portion provided on each of reentrant portions of the plurality of reentrants and protrusions, the light-diffusing portion having a function of diffusing a light. This makes it possible to diffuse a light easily. Thus, it becomes possible to provide a transmission-type screen superior in viewing angle characteristic.

In regard to the transmission-type screen of exemplary embodiments of the invention, it is preferable that the plurality of reentrants and protrusions are formed by embossing. This allows a plurality of small reentrants and protrusions to be formed on the front side layer easily and reliably.

It is preferable that the transmission-type screen of exemplary embodiments of the invention further include an optical axis conversion layer for changing a direction of an optical axis of a projection light which has penetrated the backside layer. This makes it possible to provide a transmission-type screen superior in the use efficiency of light.

In regard to the transmission-type screen of exemplary embodiments of the invention, it is preferable that a direction of the optical axis after being changed by the optical axis conversion layer is substantially perpendicular to the display plane. This makes it possible to provide a transmission-type screen further superior in the use efficiency of light.

In regard to the transmission-type screen of exemplary embodiments of the invention, it is preferable that the optical axis conversion layer is composed of a hologram. This makes it possible to change the direction of the optical axis easily. Thus, it becomes possible to provide a transmission-type screen superior in the use efficiency of light.

In regard to the transmission-type screen of exemplary embodiments of the invention, it is preferable that the backside layer is composed of a microlouver. This allows the screen to accept primarily a light projected from a direction slanted at a predetermined angle with the backside layer. Thus, it becomes possible to provide a transmission-type screen superior in the use efficiency of light.

In regard to the transmission-type screen of exemplary embodiments of the invention, it is preferable that the optical axis conversion layer is composed of any one of a microprism, a Fresnel lens, and a plurality of optical waveguides. This makes it possible to change the direction of the optical axis easily. Thus, it becomes possible to provide a transmission-type screen superior in the use efficiency of light.

In regard to the transmission-type screen of exemplary embodiments of the invention, it is preferable that the backside layer and optical axis conversion layer are integrated into an optical waveguide composed of a plurality of optical waveguide elements, the optical wave guide having an inlet portion oriented toward the projected light and an outlet portion oriented toward the display plane. This can simplify the structure of the transmission-type screen.

In regard to the transmission-type screen of exemplary embodiments of the invention, the following are preferable: the optical waveguide has a light-diffusing portion having a function of diffusing a light and the light-diffusing portion is formed by unevenly setting locations of leading ends of the plurality of optical waveguide elements. This can simplify the structure of the transmission-type screen.

It is preferable that the transmission-type screen of exemplary embodiments of the invention further include a light-diffusing portion having a function of diffusing a light which has penetrated the backside layer. This makes it possible to provide a transmission-type screen superior in viewing angle characteristic.

A projection-type display device of exemplary embodiments of the invention is characterized by including the transmission-type screen of exemplary embodiments of the invention.

By incorporating a transmission-type screen superior in viewing angle characteristic and the use efficiency of light, it becomes possible to provide a projection-type display device superior in contrast of an image focused onto the screen.

BRIEF DESCRIPTION OF THE DRAWINGS

FIG. 17 is a schematic showing the projection-type display device according to the second exemplary embodiment;

FIG. 19 is a schematic showing a structure for accommodating a mirror of the projection-type display device;

FIG. 20 is a schematic showing the structure for accommodating the mirror of the projection-type display device;

DETAILED DESCRIPTION OF PREFERRED EMBODIMENTS

Details of the transmission-type screen and projection-type display device of exemplary embodiments of the invention will be described below based on the preferred exemplary embodiments shown by the accompanying drawings.

First Exemplary Embodiment

Figure 1:
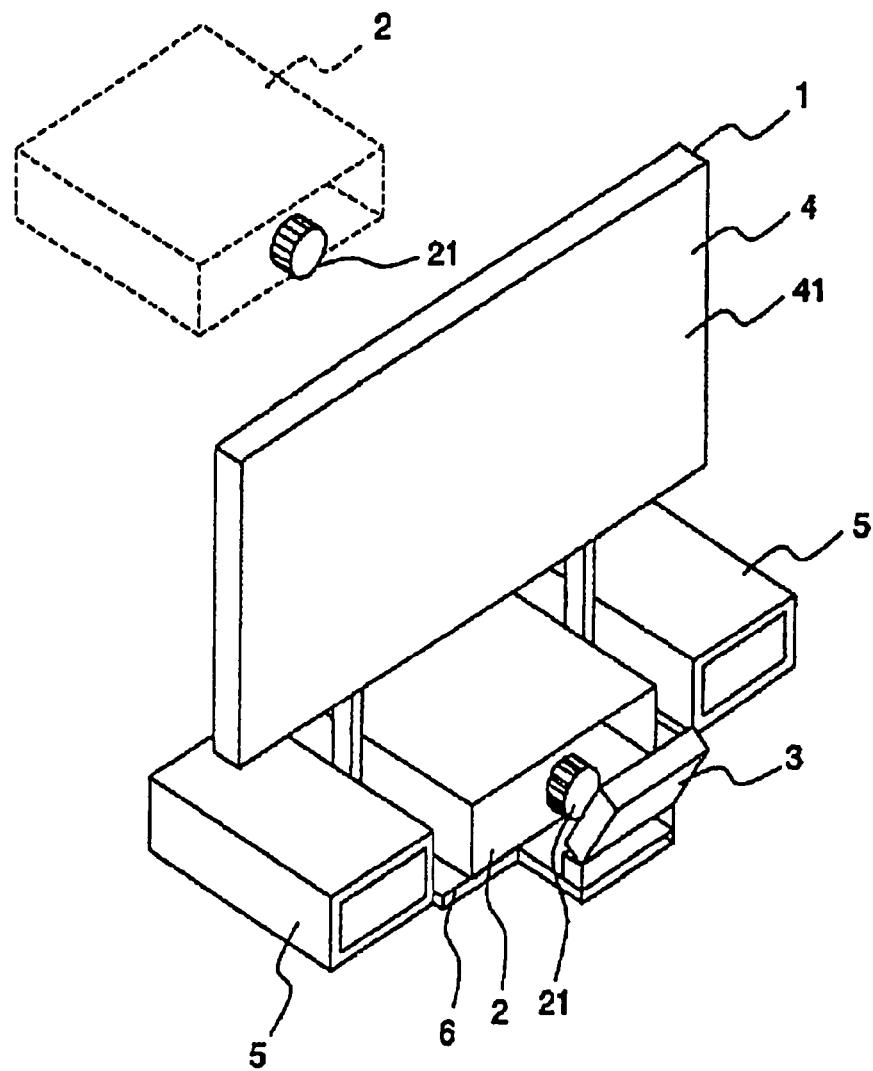
FIG. 1 is a schematic showing a projection-type display device according to the first exemplary embodiment of the invention.
Figure 2:
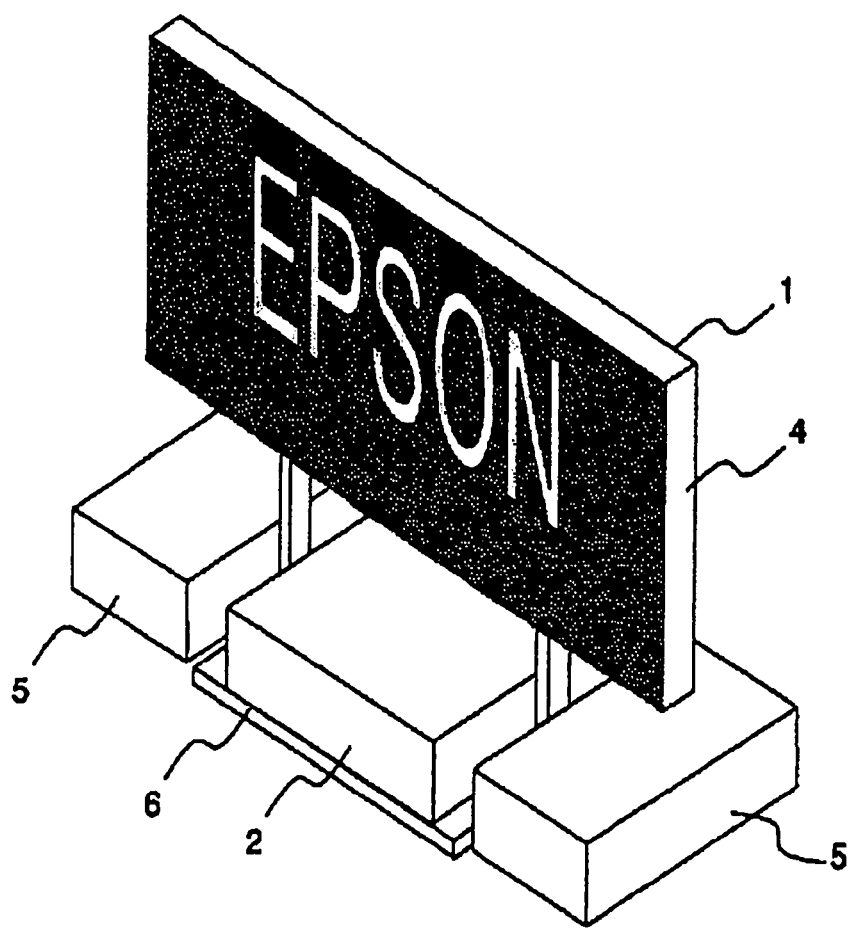
FIG. 2 is a schematic showing a condition where the projection-type display device illustrated in FIG. 1 is used.
Figure 3:
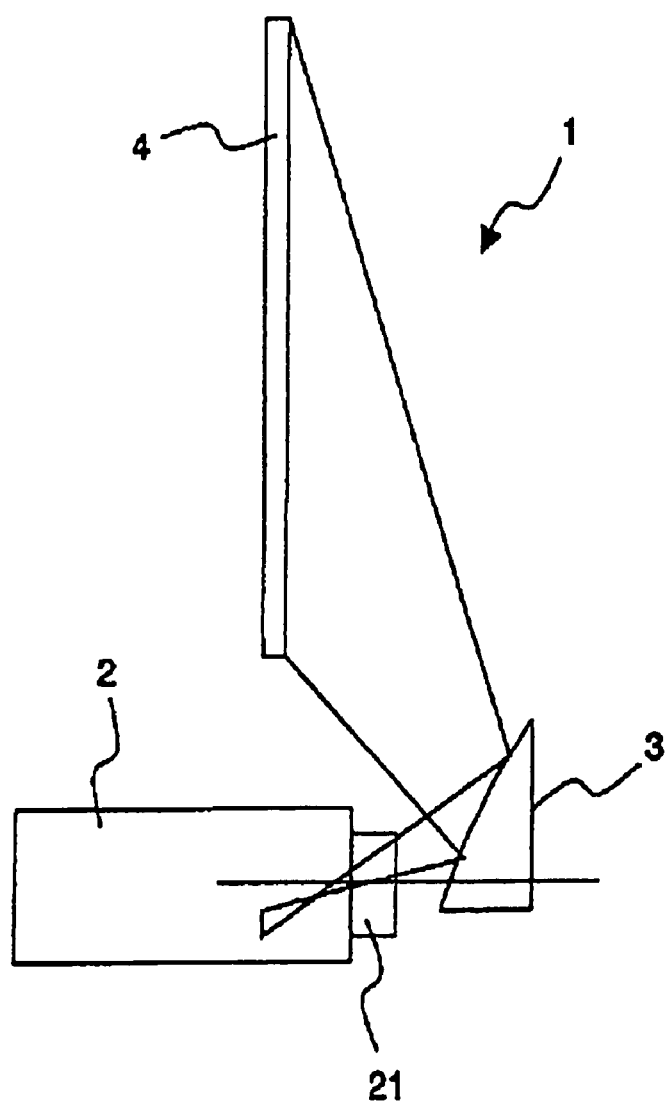
FIG. 3 is a schematic showing a condition where the projection-type display device illustrated in FIG. 1 is used.
Figure 4:
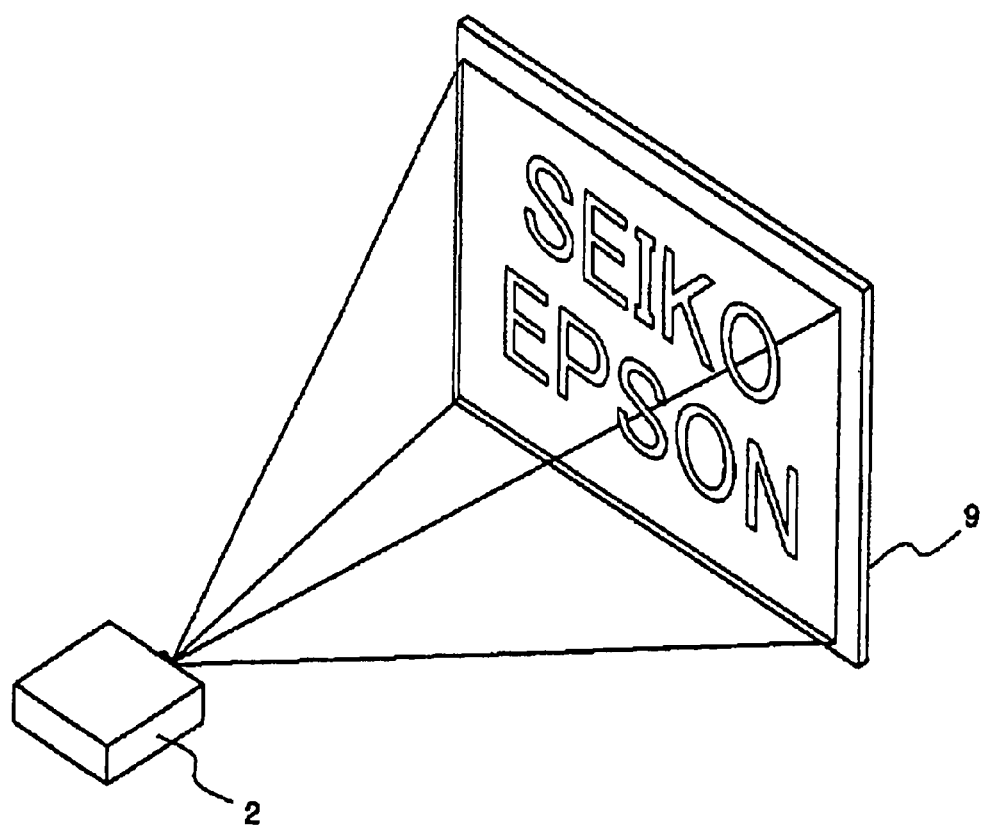
FIG. 4 is a schematic showing a condition where the projection-type display device illustrated in FIG. 1 is used.

FIG. 1 is a schematic showing a projection-type display device according to the first exemplary embodiment of the invention. FIGS. 2-4 are schematics showing conditions where the projection-type display device illustrated in FIG. 1 is used. Of the drawings, FIGS. 2 and 3 show a condition of use in rear system projection; FIG. 4 shows a condition of use in front system projection. The projection-type display device 1 has: a projector (projecting unit) 2; a mirror 3; a transmission-type screen 4 having optical transparency; speakers 5; a frame 6; and a reflection type screen 9.

Further, the transmission-type screen 4, projector 2, and mirror 3 are exposed to the outside.

The projector 2 has an image display device inside. The image display device enlarges and projects a projection light in association with a display image. The projector 2 has a projection light output portion 21 and a projector lens in the output portion 21; the projection light is enlarged and projected with the projector lens. The projector 2 is mounted on the frame 6 so that it can be removed freely (i.e. removably). In rear system projection, the projector 2 is mounted on the frame 6 and used in this situation. In contrast, in front system projection, which is to be described later, the projector 2 is detached from the frame 6 and then used.

In rear system projection to be described later, the mirror 3 reflects a projection light from the projector 2 and guides the light toward the backside of the transmission-type screen 4. The mirror 3 is removably attached (or mounted) on the frame 6, and located in front of the output portion 21 of the projector 2. The mirror 3 has an aspheric structure, and reflects the projection light in association with a lower side of a display image and the projection light in association with an upside of the display image respectively with different curvatures. Thus, the mirror 3 performs trapezoidal correction of the display image thereby to focus a proper rectangular display image onto the transmission-type screen 4.

The transmission-type screen 4 receives the projection light from the projector 2 and displays a display image on its plane. The transmission-type screen 4 has a leg member, which can be fixed to the frame 6. In a rear system projection, the transmission-type screen 4 allows a projection light projected from the backside thereof to penetrate thereby to display a display image (TRANSMISSION-TYPE SCREEN). Hereinafter, the front side of the transmission-type screen 4 means a surface of the screen on the side from which a user watches a display image and the backside of the screen means a surface of the screen opposite to the front side.

The speakers 5 are connected to the projector 2 by wires or by radio. The speakers 5 output the sound involved in a display image when being used. The speakers 5 are composed of left and right speakers used in a pair, and placed on and fixed to the frame 6. Incidentally, the projector 2 is disposed between the speakers 5 in rear system projection.

The frame 6 is a base to mount on the projector 2, mirror 3, transmission-type screen 4 and speakers 5. Here, the frame 6 has a supporting structure (supporting mechanism) capable of removably holding the projector 2. Such supporting structure for the frame 6 includes, for example, (1) a structure in which the projector 2 is mounted by being slidably inserted in the frame 6 having a guide portion, or (2) a structure in which the projector 2 is mounted by being locked to the frame 6 having a locking portion (not shown). In addition, such supporting structure of the projector 2 can be arbitrarily selected within a range obvious to those skilled in the art.

When the projection-type display device 1 is used for rear system projection (rear projection), the projector 2 is mounted by being held by the frame 6 (see FIG. 2). In other words, in rear system projection, the projector 2, mirror 3, and transmission-type screen 4 are united and mounted in place. Then, a projection light coming from the projector 2 is reflected and guided by the mirror 3 to be projected onto the transmission-type screen 4 from the backside thereof (see FIG. 3). When the projection light passes through the transmission-type screen 4, a display image appears on the front side of the transmission-type screen 4, whereby a user can watch the video image.

On the other hand, when the projection-type display device 1 is used for front system projection (front projection), the projector 2 is detached from the frame 6 and disposed in front of the separately-prepared reflection type screen 9, which reflects a projection light projected from a front side thereof thereby to display a display image (see FIG. 4). In other words, in front system projection, the projector 2 is separated from the transmission-type screen 4 and placed in a desired location. Then, a projection light is directly projected onto the reflection type screen 9 from the projector 2, whereby a display image is displayed on the reflection type screen 9. Incidentally, in front system projection, an image may be displayed by projecting a projection light onto the reflection type screen 9 as described above, or may be displayed on another display target such as a wall surface of a room or another screen (not shown). In this way, an image can be displayed in a desired location with a desired display size.

[Screen]

Figure 5:
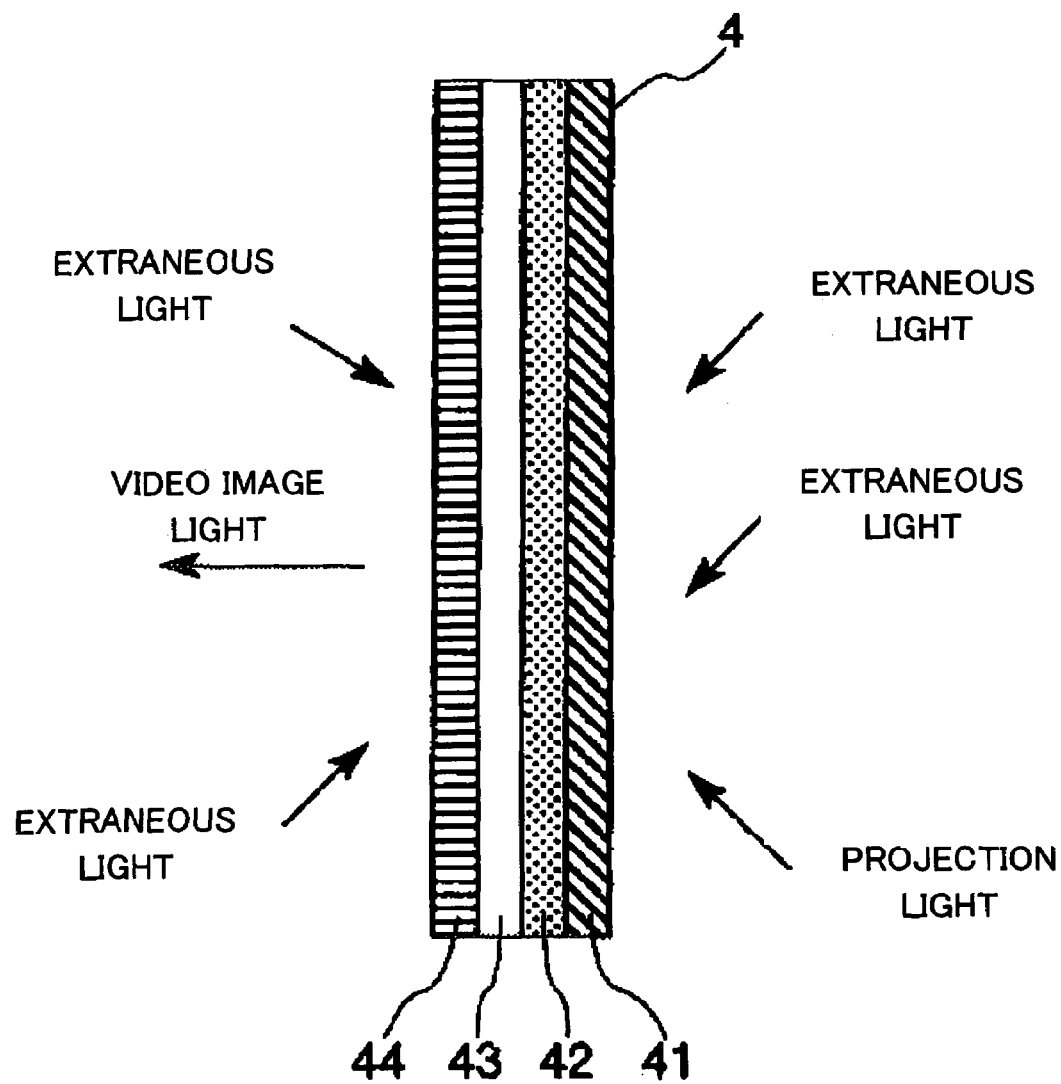
FIG. 5 is a schematic showing a screen in association with the first exemplary embodiment of the invention.

FIG. 5 is a schematic showing a transmission-type screen according to an exemplary embodiment of the invention.

Figure 6:
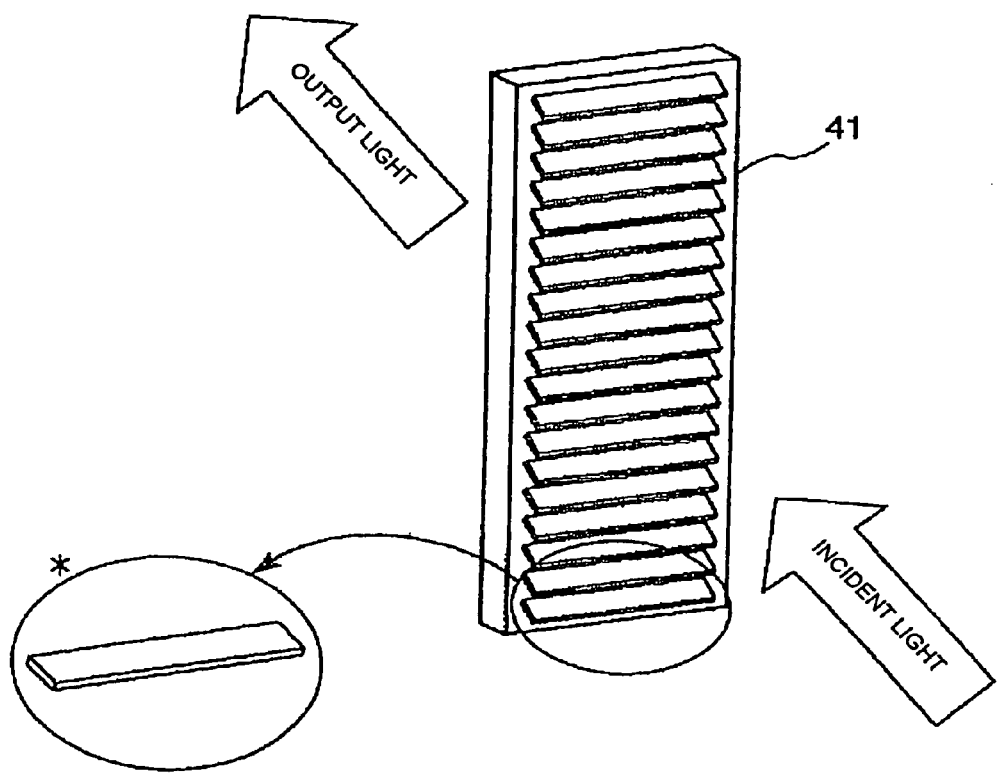
FIG. 6 is a schematic showing a constituent element of the screen illustrated in FIG. 5.
Figure 7:
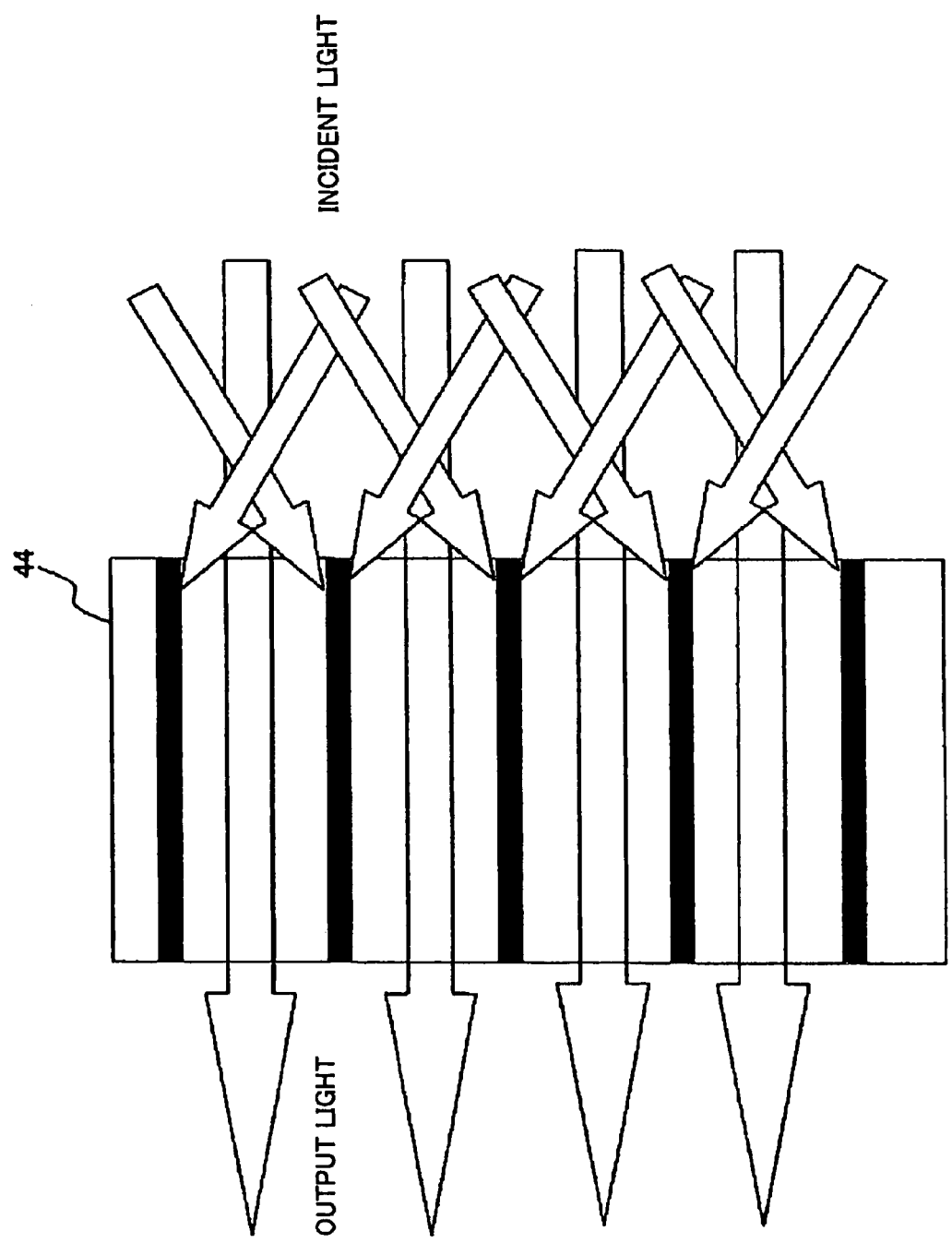
FIG. 7 is a schematic showing a constituent element of the screen illustrated in FIG. 5.

FIGS. 6 and 7 are schematics showing a constituent element of the screen illustrated in FIG. 5. FIG. 6 shows the effect of the backside layer 41, and FIG. 7 shows the effect of the front side layer 44.

The transmission-type screen 4 includes a backside layer 41, an optical axis conversion layer 42, a light diffusion layer 43, and a front side layer 44, wherein the layers are stacked in this order. The transmission-type screen 4 is characterized by including a layer having a light-directivity (i.e. backside layer 41) arranged on the side of the backside thereof, thereby allowing the projection light guided by the mirror 3 to penetrate the screen and reflecting and blocking other extraneous light.

The backside layer 41 is composed of a sheet or film member having a light-directivity, and constitutes the backside of the transmission-type screen 4. The backside layer 41 primarily allows the light projected and entered from a direction inclined by a predetermined angle to penetrate, and reflects or absorbs the light entered with an incident angle other than the predetermined angle(see FIGS. 5 and 6).

It is preferable that the angle (direction) to set the light-directivity of the backside layer 41 substantially coincides with a direction of projecting a projection light (i.e. a slanted direction) of the projector 2. This allows light to enter the backside layer 41 more efficiently.

In this exemplary embodiment, the backside layer 41 is arranged so that its direction to set the light-directivity is oriented toward the mirror 3 in the condition where the transmission-type screen 4 is mounted on the frame 6. While such backside layer 41 is not particularly limited, preferably it may be, for example, a microlouver. When the above-described material is used for the backside layer 41, the backside layer 41 can easily and surely accept light projected from the projecting direction. Therefore, it becomes possible to provide a transmission-type screen 4 superior in the use efficiency of light.

The optical axis conversion layer 42 is composed of a sheet or film member having an optical axis converting property, and is stacked on the front side of the backside layer 41. The optical axis conversion layer 42 converts the direction of the optical axis of incident light (projection light) to a particular direction because of its optical axis converting property. While such optical axis conversion layer 42 is not particularly limited, preferably it may be, for example, a hologram sheet, a microprism, a microfiber, or a Fresnel lens.

Using a material as described above for the optical axis conversion layer 42 makes it possible to change the direction of the optical axis easily. Therefore, it becomes possible to provide a transmission-type screen 4 superior in the use efficiency of light.

The light diffusion layer 43 is composed of a sheet or film member having a light diffusion property, and is stacked on the front side of the backside layer 41. The light diffusion layer 43 has the function of diffusing incident light (projection light) because of its light diffusion property. While such light diffusion layer 43 is not particularly limited, preferably it may be, for example, a lenticular lens, a rough surface, or a diffusion sheet. Using a material as described above for the light diffusion layer 43 allows light to be diffused easily. Therefore, it becomes possible to provide a transmission-type screen 4 superior in viewing angle characteristics.

The front side layer 44 is composed of a sheet or film member having a light-directivity and is stacked on the front side of the light diffusion layer 43. The front side layer 44 constitutes a display plane of the transmission-type screen 4. The front side layer 44 is preferably arranged so that its direction to set the light-directivity is substantially perpendicular to the display plane of the transmission-type screen 4 (see FIGS. 5 and 7). Also, the front side layer 44 has the function of absorbing extraneous light. Thus, the reflection of extraneous light by the display plane of the transmission-type screen 4 is suppressed, thereby enhancing the viewability of a display image. While such front side layer 44 is not particularly limited, preferably it may be a material with belt-like light-absorbing layers provided in parallel at predetermined intervals, e.g. a microlouver, a polarizing plate, or a black stripe. When a material as described above is used for the front side layer 44, it becomes possible to provide a transmission-type screen 4 superior in the use efficiency of light. The front side layer 44 may be a plane absorbing layer which is referred to as a black stripe.

In the transmission-type screen 4, in rear system projection, a projection light is guided by the mirror 3 and launched into the backside layer 41 from the backside thereof (see FIG. 5). At this time, other light (i.e. extraneous light) other than the light incident at a particular angle (which is primarily a projection light) is reflected or absorbed by the backside layer 41. Then, the projection light penetrates the backside layer 41 and enters the optical axis conversion layer 42, and is changed by the optical axis conversion layer 42 so that the direction of its optical axis is turned to a direction substantially perpendicular to a plane (i.e. the front side layer 44) of the transmission-type screen 4. Subsequently, the projection light enters the light diffusion layer 43 and is diffused there. As a result, only light adhering to the directivity of the front side layer 44 passes through the front side layer 44 and then goes out of the transmission-type screen 4 on the front side thereof. A display image is thus formed on the transmission-type screen 4.

As described above, in the projection-type display device 1, the projector 2 is configured so that it can be removed from the frame 6 and as such, a user can optionally select the rear system projection or the front system projection according to a scene where the type display device is used. For example, when a user is to view a large image, the front system projection is selected; when a relatively small image is to be viewed, the rear system projection is selected. Further, in comparison with the case of buying and installing a projection-type display device for the front system projection and another for the rear system projection, the projection-type display device 1 alone is capable of performing both the rear system projection and the front system projection. Therefore, the projection-type display device can reduce the device installation cost and save a space for placing the device. Further, in front system projection, the projector 2 is detached from the frame 6 and used in this situation. As such, a user can freely select positions to place the projector 2 and transmission-type screen 4 based on a room layout.

Furthermore, in the projection-type display device 1, the projector 2 is configured so that it can be removed from the frame 6. As such, the projector 2 can be separated from the frame 6, for example, when the device is being carried. Accordingly, it becomes possible to carry the device easily.

Also, in the projection-type display device 1, the transmission-type screen 4 has a backside layer 41 having a light-directivity; the backside layer 41 allows the projection light from the mirror 3 to penetrate and reflects extraneous light when the device is used for rear system projection. Therefore, the contrast of a display image is enhanced. This eliminates the need for such a cabinet as a related art projection-type display device has. Therefore, it becomes possible to expose the transmission-type screen 4, projector 2, and mirror 3 to the outside. In addition, the device as a whole is downsized, whereby a space for placing the device can be saved. Also, this offers many advantages including at least the following: to reduce a device weight; to make a device more compact and slimmer; to make a device smarter; to facilitate changing merchandise variations in screen size; to provide a device easy to move, to facilitate device placement; and to reduce environmental loads. Further, omitting a cabinet enhances the efficiency of cooling the device and as such, a heat-exhausting mechanism and a cooling structure thereof (e.g. a cooling fan and a heat sink) can be simplified. Since no cabinet is needed, a portable projection-type display device 1 as included in the second exemplary embodiment, which is to be described later, can be realized.

The projection-type display device 1 is arranged as follows. In rear system projection, the projector 2 is fixed to the frame 6; and the mirror 3 is disposed in front of the projector 2; and the transmission-type screen 4 is disposed with its screen plane standing up above the projector 2. In this condition, a projection light from the projector 2 is bent (owing to reflection) by the mirror 3 along a path of a substantial L form, in lateral view, and then projected onto the back surface of the transmission-type screen 4 (see FIGS. 1-3). In such arrangement, the projector 2, mirror 3, and transmission-type screen 4 are disposed more compactly, whereby a space for placing the device can be saved in a rear system projection. Also, in a rear system projection, the speakers 5 are disposed on two opposed sides of the projector 2 and as such, the space for placing the device can be saved further. In this exemplary embodiment, the projector 2 is placed in a horizontal position and light emitted from the projector 2 in a horizontal direction is bent into an acute angle (i.e. 90° or smaller) (owing to reflection) by the mirror 3. However, the condition to place the projector is not so limited. More specifically, if the projection-type display device is intended to be placed on a wall surface as a low-profile product, the projector 2 may be placed in an upright position so that light is projected upward in a vertical direction, bent into an obtuse angle (i.e. 90° or larger) (owing to reflection) by the mirror 3, and projected onto the back surface of the screen 4 after the reflection. In this case, even when rear projection is executed, a low profile similar to those of usual flat panel displays (including plasma displays and direct-view-type liquid crystal displays) can be addressed.

First Exemplary Modification

Figure 8:
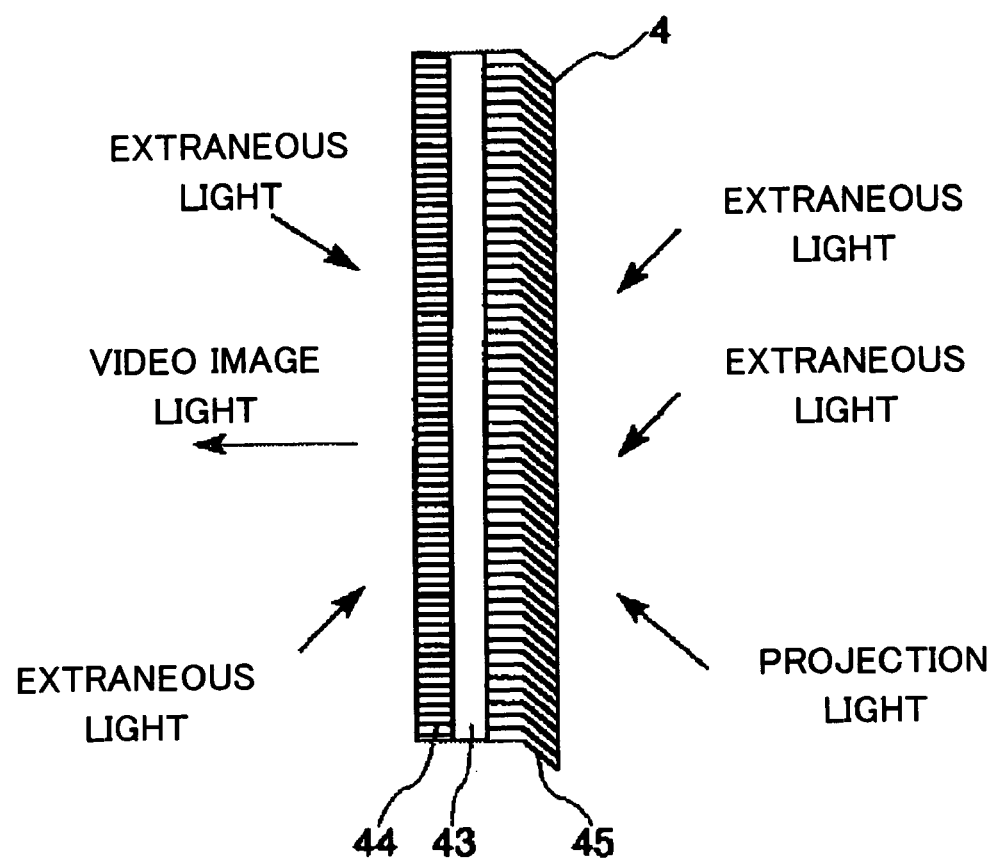
FIG. 8 is a schematic showing an exemplary modification of the screen illustrated in FIG. 5.
Figure 9:
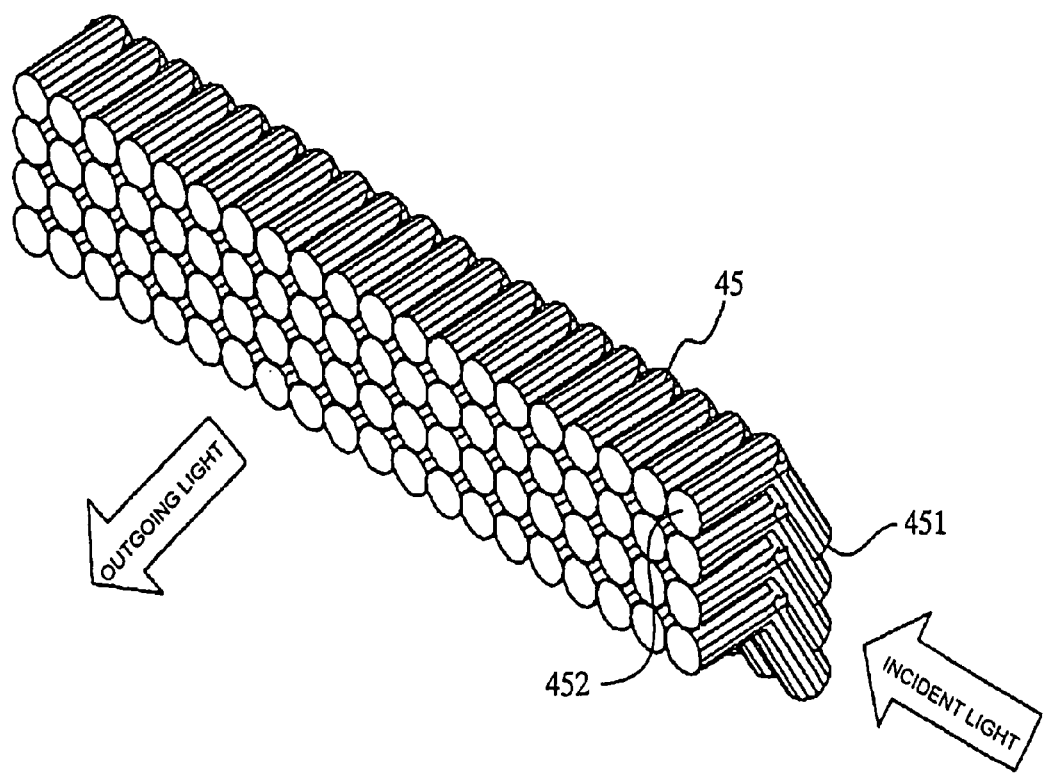
FIG. 9 is a schematic showing a substantial part of the screen illustrated in FIG. 8.
Figure 10:
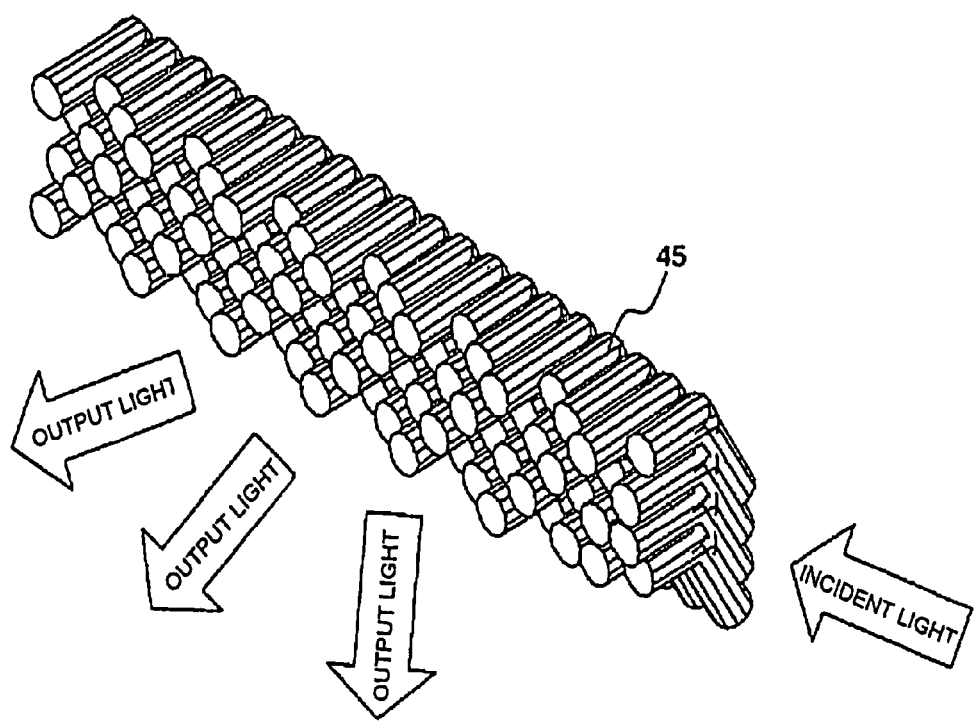
FIG. 10 is a schematic showing a substantial part of the screen illustrated in FIG. 8.

FIG. 8 is a schematic showing an exemplary modification of the screen illustrated in FIG. 5. FIGS. 9 and 10 are schematics showing a substantial part of the screen illustrated in FIG. 8. The transmission-type screen 4 is characterized in that the backside layer 41 and optical axis conversion layer 42 are integrated into an optical waveguide 45 composed of a plurality of optical waveguide elements. In other words, the transmission-type screen 4 includes the optical waveguide 45, a light diffusion layer 43, and a front side layer 44, which are stacked in this order.

The optical waveguide 45 is a member for guiding light projected and entered from its inlet portion 451 and releasing the light through its outlet portion 452, and has light-directivity and an optical axis converting property. Specifically, the optical waveguide 45 accepts and guides only the light (i.e. projection light) entered from a particular direction through the inlet portion 451 and releases the light through the outlet portion 452 in a predetermined direction. The optical waveguide 45 constitutes the backside of the transmission-type screen 4, and is placed with its inlet portion 451 oriented toward the mirror 3 (see FIGS. 8 and 9). The optical waveguide 45 is curved or bent halfway across the length thereof, and disposed so that its outlet portion 452 is oriented substantially perpendicularly to a plane of the light diffusion layer 43. The optical waveguide 45 is constituted by, for example, a bundle of optical fibers, having a curved or bent portion.

In regard to the transmission-type screen 4, a projection light is guided toward the backside of the screen by the mirror 3, and enters the optical waveguide 45 in rear system projection (see FIG. 8). At this time, only the projection light entered at a particular angle is guided from the inlet portion 451 inside the optical waveguide 45, and other light (i.e. extraneous light) is reflected or absorbed by the inlet portion 451. Then, the projection light travels in the optical waveguides 45 while undergoing the total internal reflection, followed by being released from the outlet portion 452 toward the light diffusion layer 43. Subsequently, the projection light is diffused by the light diffusion layer 43 to enter the front side layer 44, whereby a display image is formed on the transmission-type screen 4.

In the transmission-type screen 4, the backside layer 41 and optical axis conversion layer 42 are integrated into a single optical waveguide 45 and as such, the configuration of the transmission-type screen 4 can be simplified.

Incidentally, with the transmission-type screen 4, in the case where the optical waveguide 45 is constituted by a bundle of a plurality of optical fibers (see FIGS. 8 and 9), it is preferable to fill a light-absorbing material (not shown) into gaps between the optical fibers. As a result of this, extraneous light other than the projection light is blocked by the backside of the transmission-type screen 4 (the optical waveguide 45) efficiently, and therefore the contrast of a display image is further enhanced.

While the optical waveguide 45 of the transmission-type screen 4 is arranged in the condition where outlet portions 452 of its waveguide elements are arrayed at a height in the lengthwise direction of the waveguide (see FIGS. 8 and 9), the transmission-type screen 4 is not so limited. The optical waveguide 45 may be arranged so that the outlet portions 452 are mutually located at different heights (see FIG. 10). For example, with the optical waveguide 45 illustrated in FIG. 10, planes in which outlet portions 452 of the waveguide elements 452 are located are arrayed at three different heights unevenly (or irregularly). With such arrangement, the projection light can be diffused in the vicinity of the outlet portion 452 of the optical waveguide 45. This enables the following arrangements (not shown): one is that the light diffusion layer 43 is made thinner; another is that the light diffusion layer 43 is omitted (e.g. the transmission-type screen 4 is formed by stacking an optical waveguide 45 as illustrated in FIG. 10 and a front side layer 44). Therefore, the structure of a screen can be made more simplified.

Second Exemplary Modification

Figure 11:
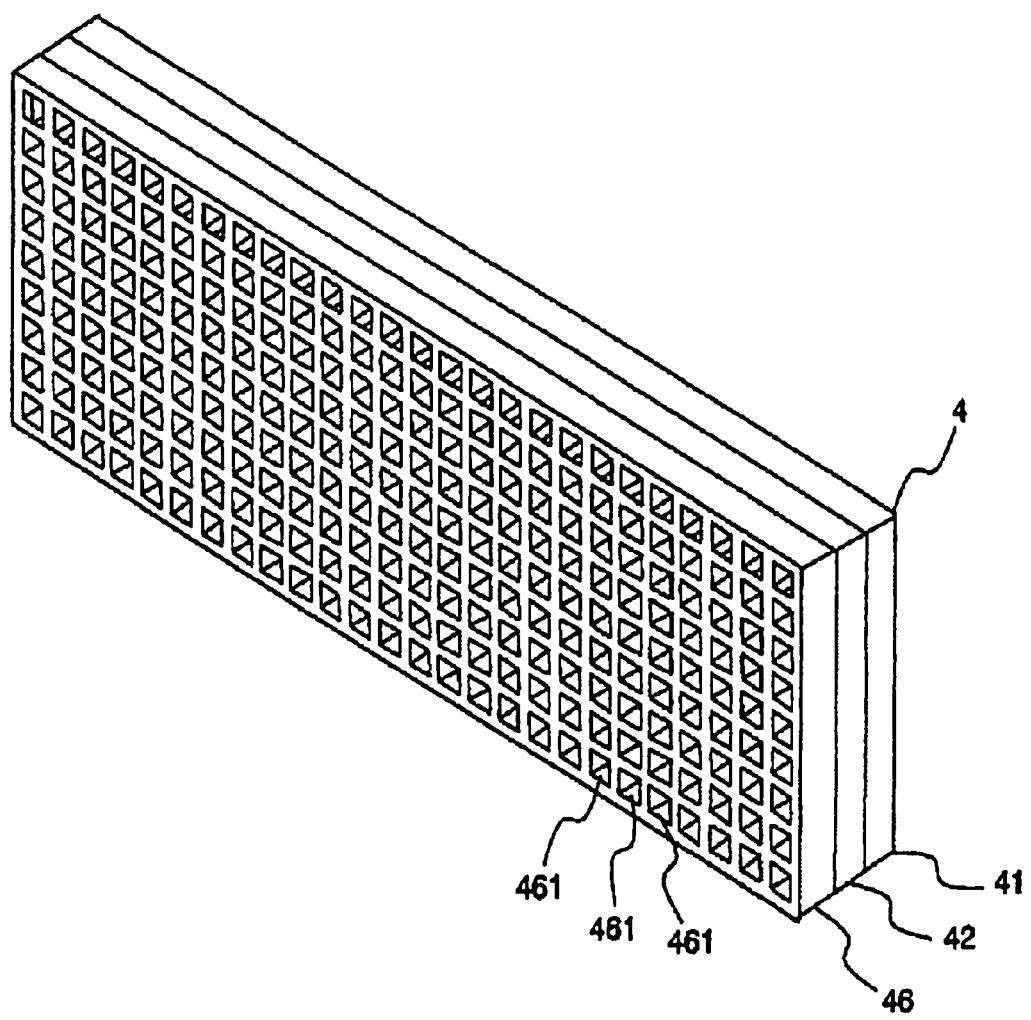
FIG. 11 is a schematic showing an exemplary modification of the screen illustrated in FIG. 5.
Figure 12:
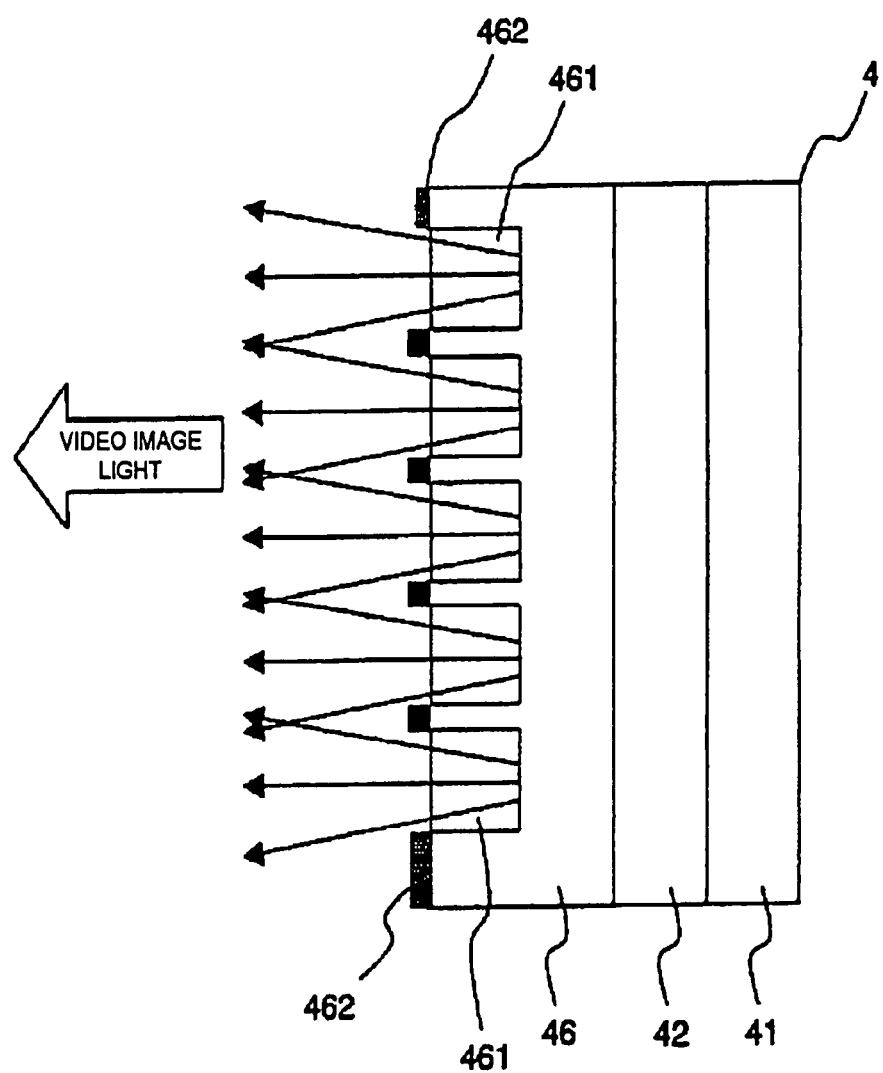
FIG. 12 is a schematic showing an exemplary modification of the screen illustrated in FIG. 5.
Figure 13:
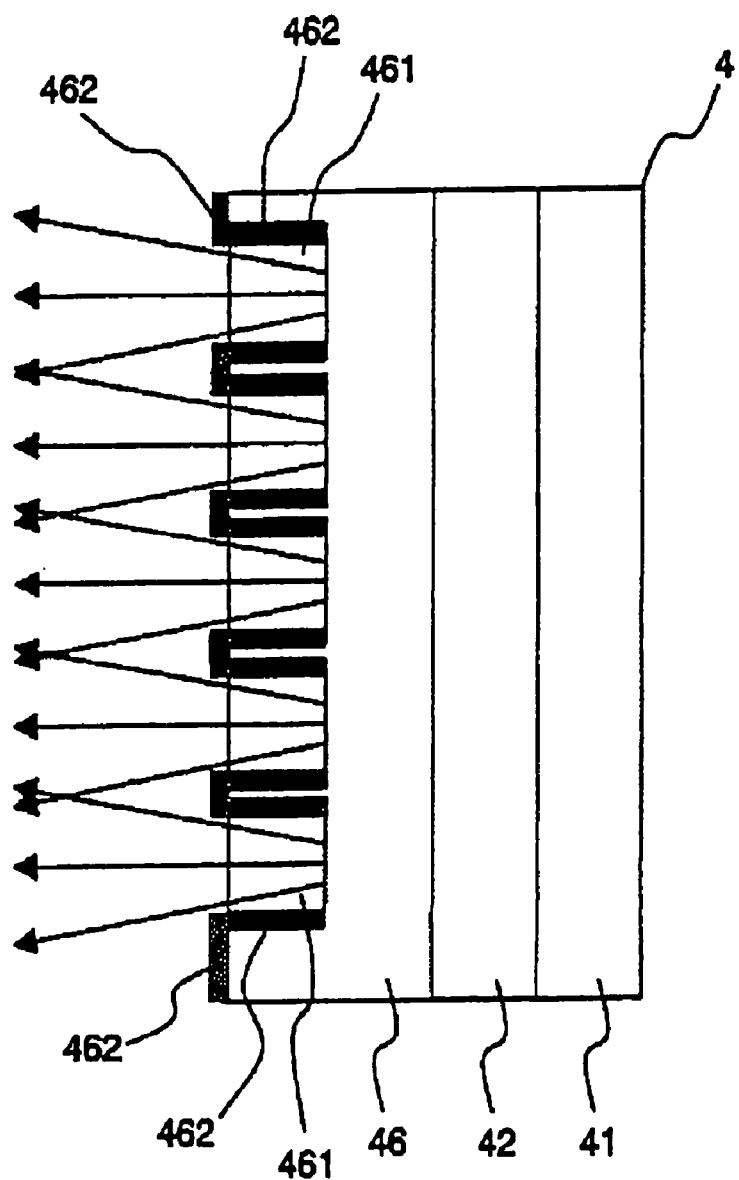
FIG. 13 is a schematic showing an exemplary modification of the screen illustrated in FIG. 5.
Figure 14:
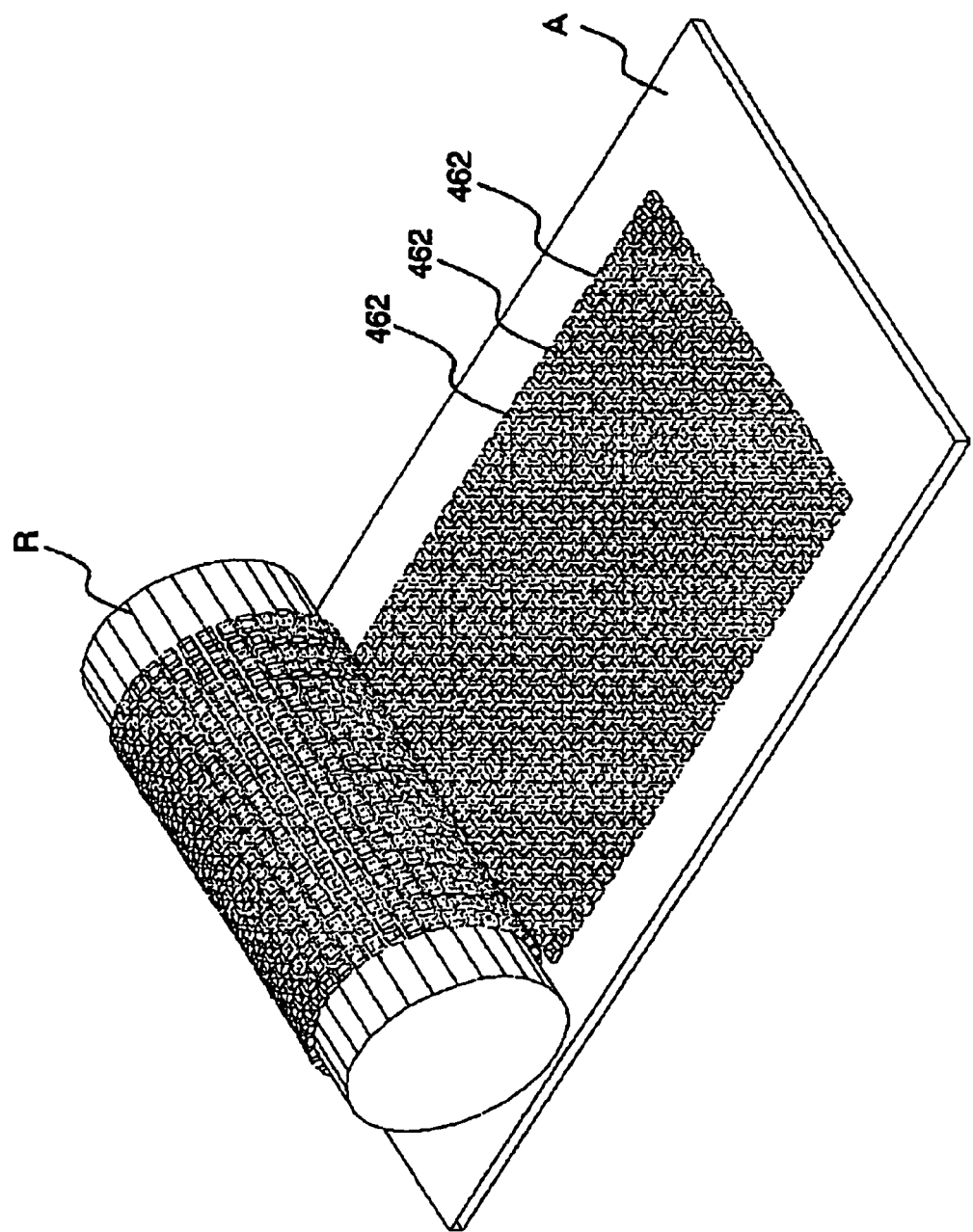
FIG. 14 is a schematic showing a process of manufacturing the screen illustrated in FIGS. 11-13.

FIGS. 11-13 are schematics showing an exemplary modification of the screen illustrated in FIG. 5. FIG. 14 is a schematic showing a manufacturing process of the screen illustrated in FIGS. 11-13. The transmission-type screen 4 is characterized in that the light diffusion layer 43 and front side layer 44 are integrated into a single embossed layer 46. More specifically, the transmission-type screen 4 is formed by stacking a backside layer 41, an optical axis conversion layer 42, and an embossed layer 46.

In the front face of the embossed layer 46, there are formed a plurality of small reentrant and protrudent portions 461 (or light-releasing pits) in an embossed form (see FIGS. 11-13). Also, on a protrudent face of the embossed layer 46 (or the protrudent faces of the reentrant and protrudent portions 461) is formed a light-absorbing layer 462. In regard to the embossed layer 46, the bottom face of each reentrant and protrudent portion 461 (the bottom face of the reentrant portion) has the function of diffusing light, and the light-absorbing layer 462 serves to absorb light. The light-absorbing layer 462 may be formed by painting the surface of the embossed layer 46 black by means of printing or the like.

With the transmission-type screen 4, a projection light from the projector 2 is incident on the backside layer 41, goes through the optical axis conversion layer 42, and enters the embossed layer 46 from the backside thereof, in rear system projection. Then, the projection light is diffused by the bottom faces of the reentrant and protrudent portions 461, and released forward through the light-releasing pits (i.e. reentrant spaces of the reentrant and protrudent portions 461) (see FIG. 12), whereby a display image is formed on the transmission-type screen 4. The extraneous light entering the transmission-type screen 4 from the front face of the screen is absorbed by the light-absorbing layer 462 of the embossed layer 46. As a result, the reflection of the extraneous light by the front face of the transmission-type screen 4 is suppressed, whereby the viewability and contrast of a display image are enhanced.

In the transmission-type screen 4, the light diffusion layer 43 and front side layer 44 are integrated into a single embossed layer 46 and as such, the configuration of the transmission-type screen 4 can be made simpler.

While in the transmission-type screen 4 the light-absorbing layer 462 is formed only on the protrudent face of the embossed layer 46, the screen is not so limited. It is preferable that the light-absorbing layer 462 is formed on both the protrudent faces of the reentrant and protrudent portions 461 and inner side surfaces thereof (i.e. side surfaces inside the reentrant portions except bottom faces thereof) (see FIG. 13). This makes possible to suppress the reflection of extraneous light by the front face of the transmission-type screen 4 more efficiently and as such the viewability of a display image is further enhanced.

In the transmission-type screen 4, the embossed layer 46 is constituted by a flat-plate-shaped resin material A with a plurality of reentrant and protrudent portions 461 formed thereon. Specifically, the embossing process is carried out by rolling a roll stamper R having an embossing pattern on the flat-plate-shaped resin material A under a predetermined pressure, thereby forming the reentrant and protrudent portions 461 of the embossed layer 46 (see FIG. 14). By such arrangement (the above screen manufacturing method), many reentrant and protrudent portions 461 can be formed easily.

Third Exemplary Modification

In the projection-type display device 1, there is mounted only a single mirror 3 (see FIGS. 1 and 3). According to such arrangement, in the case of rear system projection, a projection light from the projector 2 is once inverted by the mirror 3 and a display image is formed on the transmission-type screen 4 from its backside. As a result, the display image appears on the transmission-type screen 4 with its left and right displayed correctly (see FIGS. 2 and 3). In contrast, in the case of front system projection, a display image is directly displayed on the transmission-type screen 4 with its left and right showing up correctly. Thus, the left and right of a display image appearing on the transmission-type screen 4 are unchanged between the cases of rear system projection and front system projection.

However, the projection-type display device 1 is not so limited, and it may have a plurality of mirrors 3 mounted therein. For example, even when an odd number of the mirrors 3 are mounted, a display image appears on the transmission-type screen 4 with its left and right displayed correctly as in the case of using a single mirror 3. Also, the display device 1 may be arranged so that an even number of mirrors 3 are mounted depending on its application. With such arrangement, the left and right of a display image on the transmission-type screen 4 can be inverted depending on the number of mounted mirrors 3, the condition of the optical path of a projection light, etc. when the rear/front system projection is switched. In such case, the scanning direction of an image is controlled by an image display device in the projector 2 thereby to adjust the image in its left-and-right inversion/non-inversion. Thus, the display image will be adjusted so that the left and right thereof appear correctly. Alternatively, such adjustment may be made by controlling the displayed data through a command from a display controller, etc.

Fourth Exemplary Modification

In the projection-type display device 1, the projector 2 has one projector lens (not shown), which is hereinafter referred to as one lens system. According to this arrangement, three primary color projection lights are combined when they impinge on projector lens. Thus, in the one lens system, projection lights are made to travel along a common optical path and then projected onto the transmission-type screen 4 after having passed through the projector lens. Therefore, even when the projection distance to the transmission-type screen 4 is changed, images of three primary colors shifted relative to one another are never projected.

In contrast, the related art includes an arrangement (three lens system) having projector lenses each provided for one primary color, in which projection lights are combined on the screen. In regard to such arrangement, the related art includes three primary color projection lights are made to travel along respective optical paths and then are projected onto the transmission-type screen 4 after having passed through the corresponding projector lenses and as such, images of three primary colors are shifted relative to one another in projection when the projection distance to the transmission-type screen 4 is changed. Therefore, such arrangement requires complicated convergence adjustment, i.e. the adjustment by which three primary color images are superposed on one another accurately. This adjustment is particularly required in the case of front system projection, in which the projection distance would be changed.

From this standpoint, the projection-type display device 1 is preferable because one lens system is adopted for the projector 2 thereby to eliminate the need for the mechanism for carrying out the forementioned convergence adjustment during front system projection. However, this isn't necessarily the best way, three lens system may be adopted for the projector 2 by mounting a related art mechanism for convergence adjustment.

Fifth Exemplary Modification

In regard to the projection-type display device 1, there is no restriction imposed on the number of liquid crystal panels (not shown) in the projector 2. Therefore, the projector 2 may have a single liquid crystal panel, or a plurality of liquid crystal display panels. In other words, for example, a system for projecting a monochromatic or color image displayed on a single liquid crystal panel may be adopted for the projector 2. Alternatively, a system for combining and projecting a plurality of display images may be adopted. For these projection systems, related art means may be adopted within a range obvious to those skilled in the art.

Sixth Exemplary Modification

As for the projection-type display device 1, related art means may be adopted as the image display device of the projector 2 within a range obvious to those skilled in the art. For example, a device which projects an image on a liquid crystal display panel as described above may be adopted as the image display device of the projector 2. Also, a reflection type MEMS device such as a DMD (Digital Micromirror Device)(TM), and a reflection type micro-liquid crystal device, referred to as LCOS (Liquid Crystal On Silicon) may be adopted as an image display device capable of projecting an enlarged image.

Seventh Exemplary Modification

Figure 15:
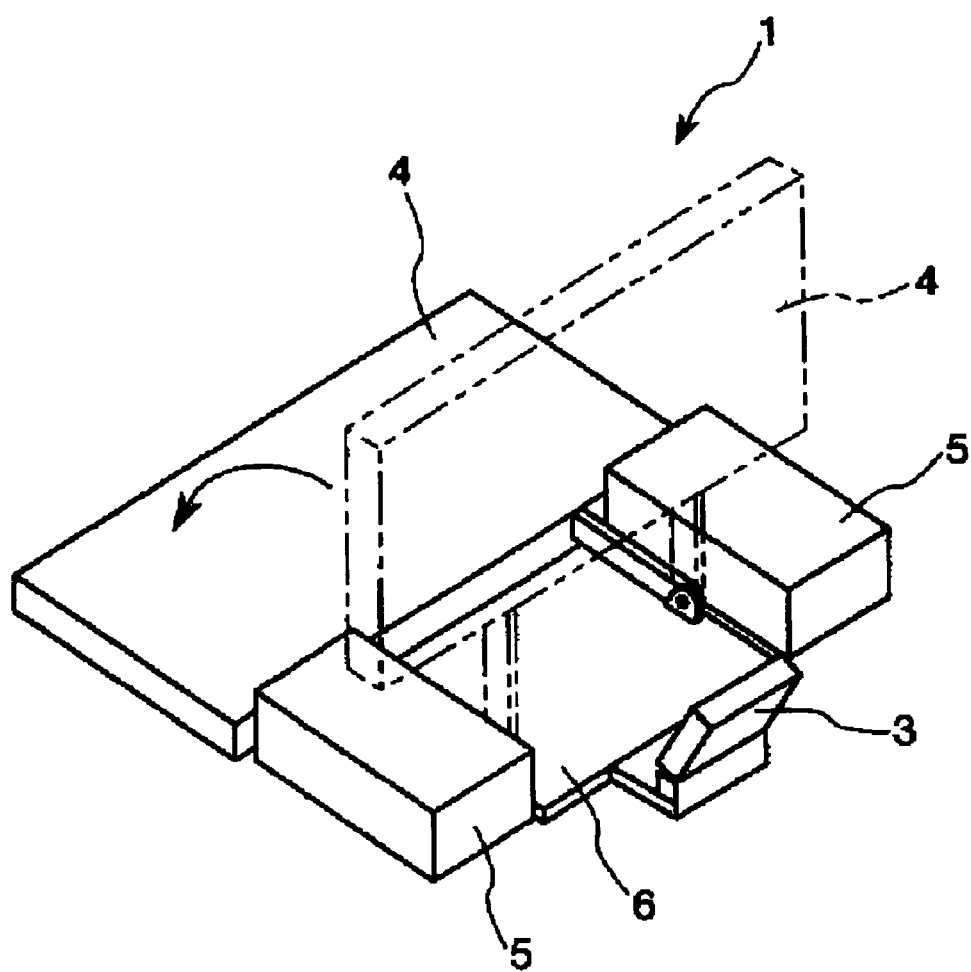
FIG. 15 is a schematic showing a function of the projection-type display device illustrated in FIG. 1.

Further, in the projection-type display device 1, the leg member of the transmission-type screen 4 is coupled to the frame 6 by means of a pin or the like, for example. In other words, the transmission-type screen 4 is coupled so that it can be laid down with respect to the frame 6. It is preferable to arrange the transmission-type screen 4 so that it can be folded with respect to the frame 6 when it is out of use or during transportation (see FIG. 15). In this case, for example, when an image is displayed on a wall behind the transmission-type screen 4 by front system projection in the condition where the projector 2 is detached from the frame 6, folding the transmission-type screen 4 can bring the display device 1 into the form in which the transmission-type screen 4 is located out of the optical path of a projection light from the projector 2. In addition, the entire device can be made more compact.

With the projection-type display device 1, it is preferable that the transmission-type screen 4 is mounted on the frame 6 removably (not shown). In this case, for example, when an image is displayed on a wall behind the transmission-type screen 4 by front system projection, detaching the transmission-type screen 4 from the frame 6 can bring the display device 1 into the form in which the transmission-type screen 4 is located out of the optical path of a projection light from the projector 2. Therefore, the front/rear projection system can be switched easily.

Further, since the transmission-type screen 4 can be detached from the frame 6 to be carried individually when the display device is carried, the display device is made easier to carry.

Eighth Exemplary Modification

In regard to the projection-type display device 1, it is preferable that the mirror 3 is attached (or mounted) on the frame 6 removably. In this case, detaching the mirror 3 from the frame 6 can bring the display device 1 into the form in which the mirror is located out of the optical path of a projection light from the projector 2 in front system projection. Therefore, the front/rear projection system can be switched easily.

In addition, since the mirror 3 can be detached from the frame 6 (and the projector 2 and transmission-type screen 4) to be carried individually when the display device is carried, the display device is made easier to carry.

Second Exemplary Embodiment

Figure 16:
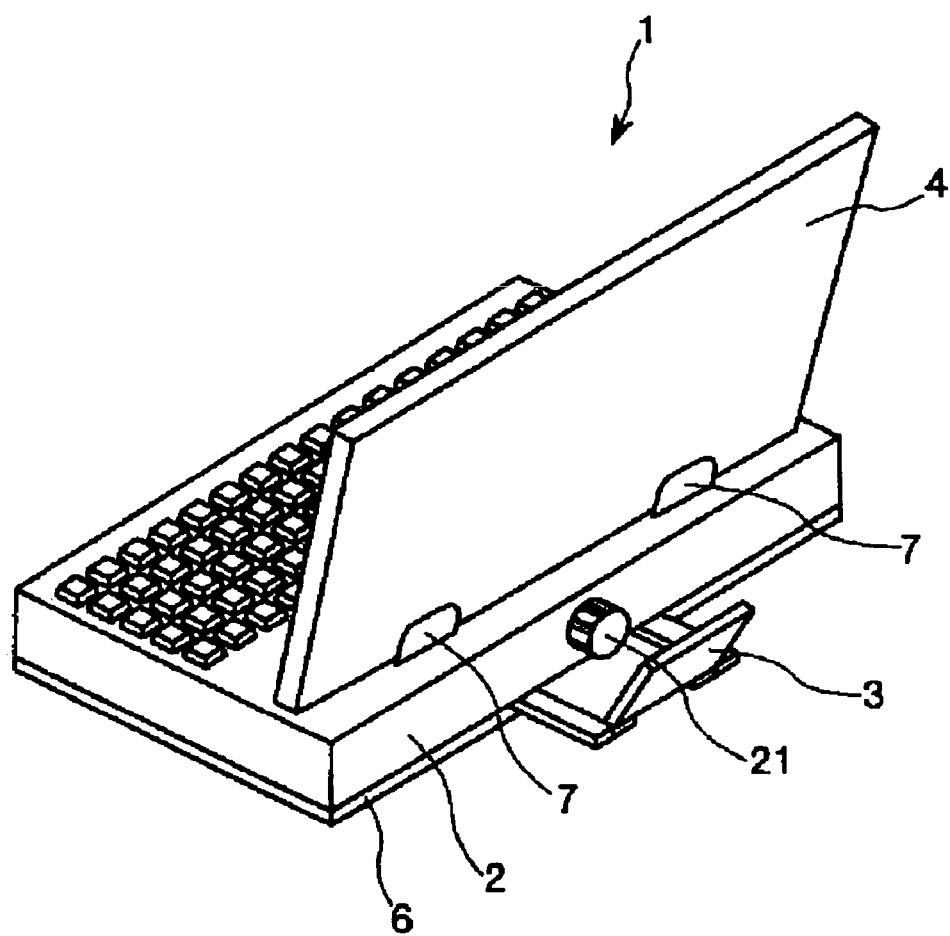
FIG. 16 is a schematic showing a projection-type display device according to the second exemplary embodiment.
Figure 18:
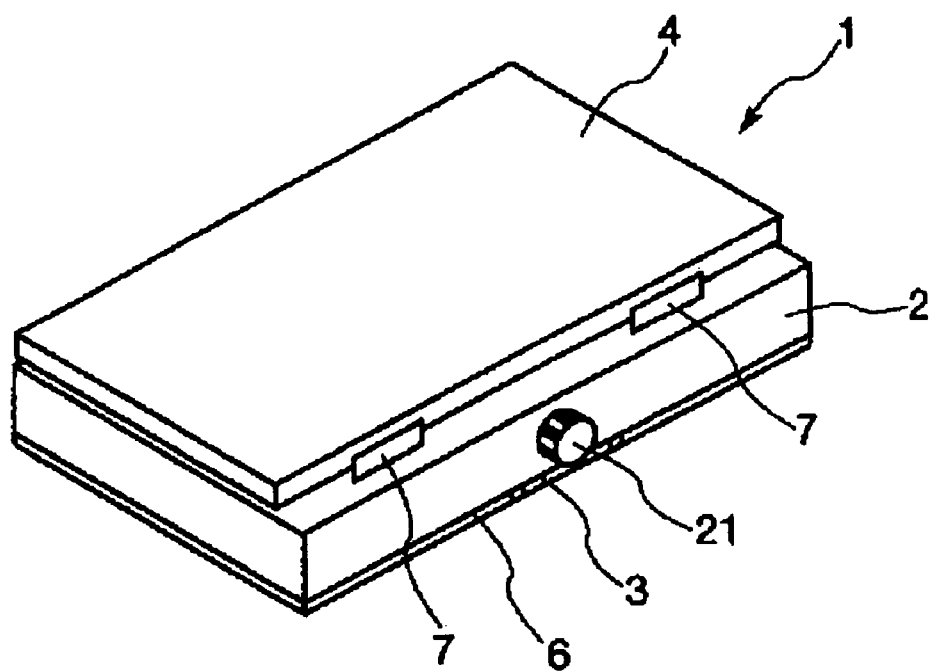
FIG. 18 is a schematic showing the projection-type display device according to the second exemplary embodiment.
Figure 21:
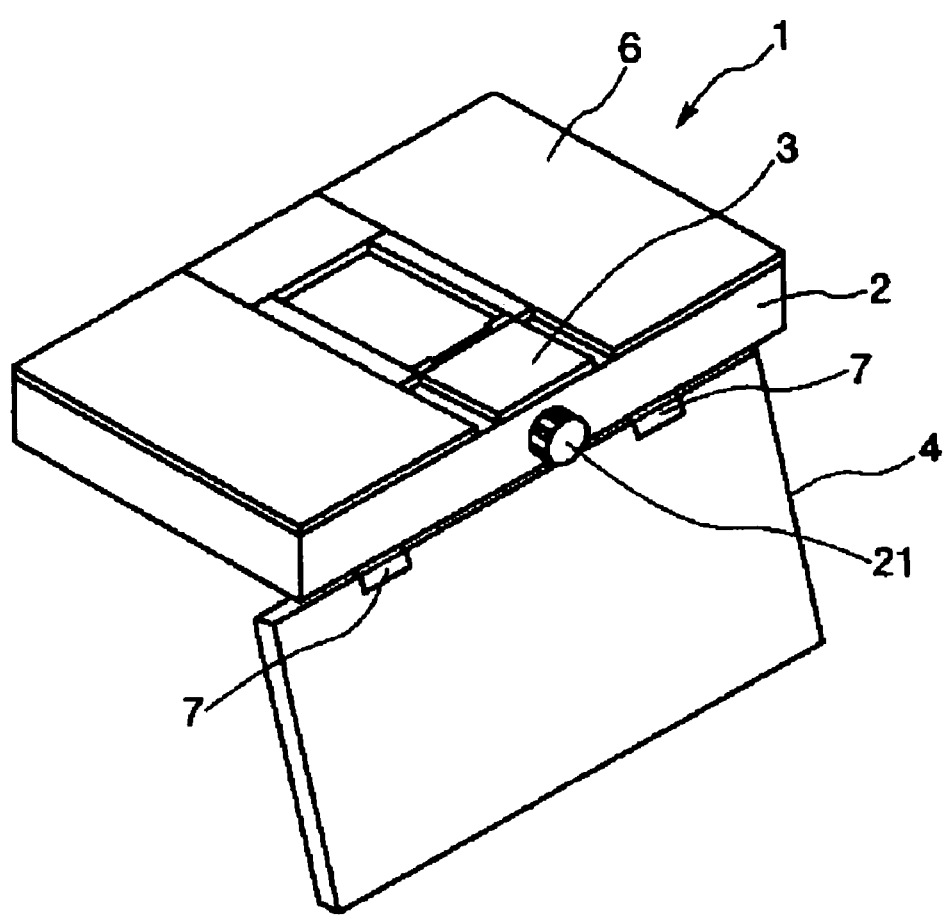
FIG. 21 is a schematic showing the structure for accommodating the mirror of the projection-type display device.

FIGS. 16-18 are schematics showing a projection-type display device according to the second exemplary embodiment of the invention. Of the drawings, FIGS. 16 and 17 present a backside perspective view (FIG. 16) of the projection-type display device 1 in rear system projection and a front side perspective view (FIG. 17) thereof. FIG. 18 presents a perspective view of the projection-type display device 1 in front system projection. Further, FIGS. 19-21 are illustrations of assistance in describing a structure for accommodating the mirror of the projection-type display device illustrated in FIGS. 16-18. These drawings present views of the projection-type display device 1 when the display device is viewed from the backside thereof.

The projection-type display device 1 of the second exemplary embodiment will be described below focusing on the difference points between the first and second exemplary embodiments. However, descriptions about like matters will be omitted here.

The projection-type display device 1 is characterized by having: a projector 2; a mirror 3; a transmission-type screen 4; and a frame 6, wherein the mirror 3, screen 4 and frame 6 are formed integrally with the projector 2. The projection-type display device 1 has a configuration such that the projector 2 corresponds to, so to speak, a PC body of an existing notebook-sized personal computer (hereinafter referred to as notebook-sized PC), and the transmission-type screen 4 corresponds to a liquid crystal display device thereof.

The mirror 3 is held by the frame 6, and mounted on the bottom face of the projector 2 through the frame 6. The mirror 3 is positioned so that a mirror face of the mirror is located forward of the output portion 21 of the projector 2 in rear system projection (see FIG. 16). Also, the mirror 3 is mounted so that it can be accommodated by sliding the mirror with respect to the frame 6 (see FIGS. 19-21). Specifically, the mirror 3 is slid along guide grooves provided in a plane of the frame 6, and then accommodated in the plane of the frame 6. However, the structure for accommodating the mirror 3 is not limited as described above.

The transmission-type screen 4 is a transmission-type screen having a plate-like structure, and is coupled (or connected) to the upper face of the projector 2 through a set of hinges 7 so that it can be opened and closed (see FIGS. 16 and 18). In other words, the transmission-type screen 4 and the projector 2 are coupled to each other foldably. Such coupling structure is not limited to the coupling structure involving hinges 7, and may be arbitrarily selected within a range obvious to those skilled in the art.

In regard to the projection-type display device 1, the transmission-type screen 4 is disposed with its display plane standing upright above the projector 2 in rear system projection, just as the lid (i.e. liquid crystal display device) of a notebook-sized PC stands upright when opened. Projection light from the projector 2 is guided by the mirror 3 and projected onto the transmission-type screen 4 from the backside thereof, whereby a display image is displayed on the transmission-type screen 4 (see FIG. 17).

On the other hand, in front system projection, the transmission-type screen 4 is laid down on the upper face of the projector 2 using the set of hinges 7 as a rotational axis just as the lid of a notebook-sized PC is closed (see FIG. 18). In parallel with this, the mirror 3 is slid with respect to the frame 6 thereby to be thus accommodated in the plane of the frame 6 (see FIGS. 19-21). Then, the projection-type display device 1 in this condition can be used as a projector 2 to project a projection light, thereby displaying an image on a wall surface or the like in a room.

The projection-type display device 1 can provide the same advantage as that of the above-described projection-type display device 1 according to the first exemplary embodiment can provide.

The projection-type display device 1 takes the form in which the transmission-type screen 4 is located on the optical path of a projection light from the projector 2 with the screen 4 standing upright with respect to the projector 2 in rear system projection. In front system projection, the display device 1 takes the form in which the transmission-type screen 4 is located out of the optical path of a projection light from the projector 2 with the screen 4 laid down on the projector 2. In this way, rear/front system projection can be switched easily. Further, the projection-type display device 1 is more compact and space-saving because it doesn't require such a cabinet as a related art projection-type display device has.

Furthermore, in the projection-type display device 1, the mirror 3 and transmission-type screen 4 are formed integrally with the projector 2 and as such, the display device is smaller in size and easier to carry in comparison to a related art projection-type display device. Also, in the projection-type display device 1, the transmission-type screen 4 is coupled to the projector 2 so that it can be opened and closed, and therefore the entire device can be folded. Thus, the device can be folded into its compact form when the device is out of use or being transported, or used for front system projection.

Particularly, in the projection-type display device 1, the transmission-type screen 4 has a backside layer 41 having a light-directivity on its backside as in the case of the projection-type display device 1 of the first exemplary embodiment. In rear system projection, the backside layer 41 can enhance the contrast of a display image. Therefore, the projection-type display device 1 can enhance the visibility of a display image without such a cabinet as a related art projection-type display device has.

First Exemplary Modification

The related art includes a device having a plurality of mirrors which are arranged so as to guide a projection light from its projecting unit to its screen with the mirrors (not shown). Such arrangement requires mirrors having a large area depending on the cross sectional area of a projection light. This is because the longer the path that the projection light travels through, the larger the cross sectional area of the projection light becomes. However, with the arrangement of the projection-type display device 1 in which the mirror 3 can be slid and then accommodated, it is difficult to slide and accommodate a mirror having a large area like that. More specifically, the following problems can be posed, for example. One is that a mechanism for accommodating the mirrors 3 (or frame 6) is upsized. Another is that the space for accommodating the mirrors cannot be fixed.

On this account, the projection-type display device 1 is so arranged that only a single mirror 3 is mounted therein and only the single mirror 3 is accommodated (see FIGS. 16-21). Therefore, the mechanism for accommodating the mirror 3 can be simplified, and the mirror 3 can be accommodated compactly. Further, the projection-type display device 1 is easy to accommodate the mirror 3 and as such, the rear/front system projection can be switched easily.

While in the projection-type display device 1, the mirror 3 is accommodated in the frame 6, the display device is not so limited. For example, the mirror 3 may be accommodated in the projector 2 (not shown). Also, in the projection-type display device 1, the mirror 3 may be removably mounted on the frame 6. Thus, the mirror 3 can be separated from the frame 6 (and projector 2 and transmission-type screen 4) and carried when the device is transported. This facilitates transporting the device.

Second Exemplary Modification

Figure 22:
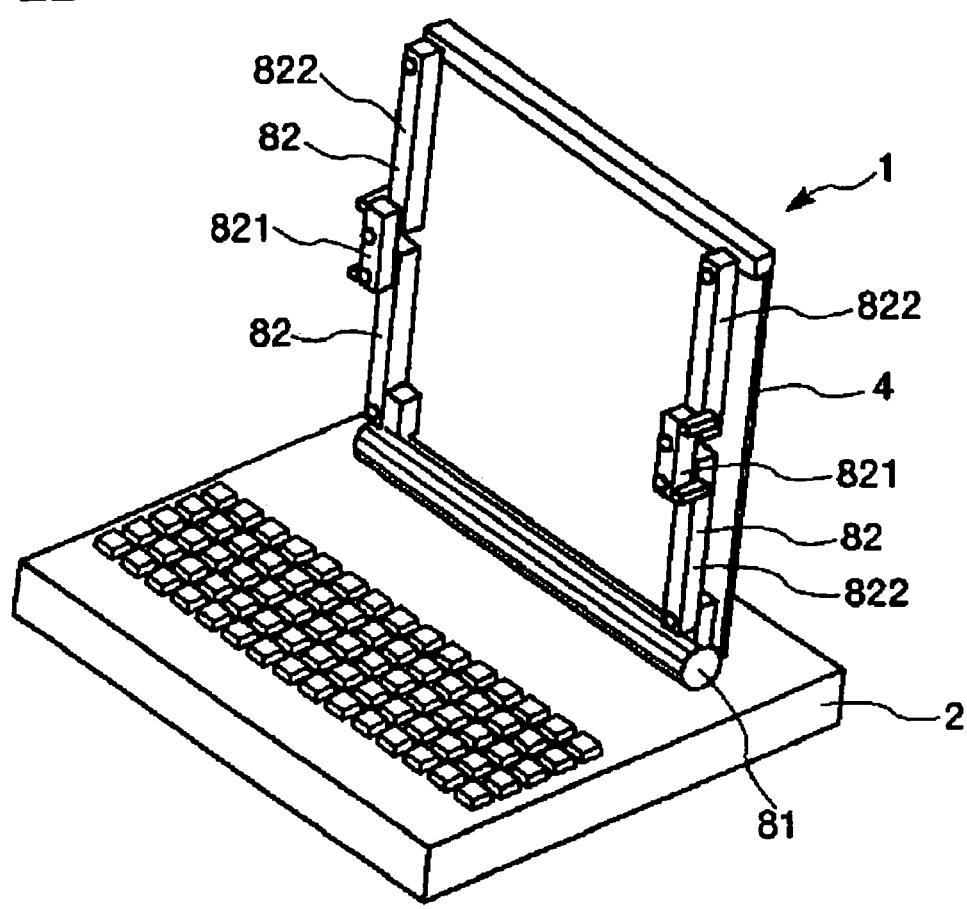
FIG. 22 is a schematic showing an exemplary modification of the projection-type display device illustrated in FIGS. 16-18.
Figure 23:
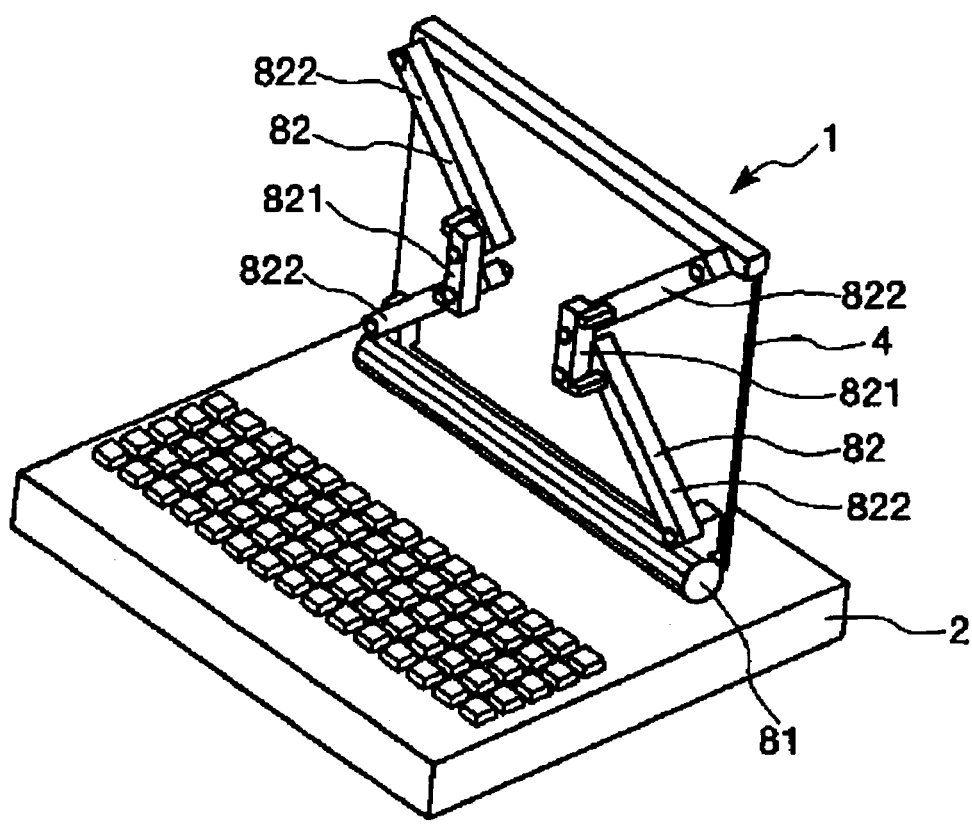
FIG. 23 is a schematic showing a function of the projection-type display device illustrated in FIG. 22.
Figure 24:
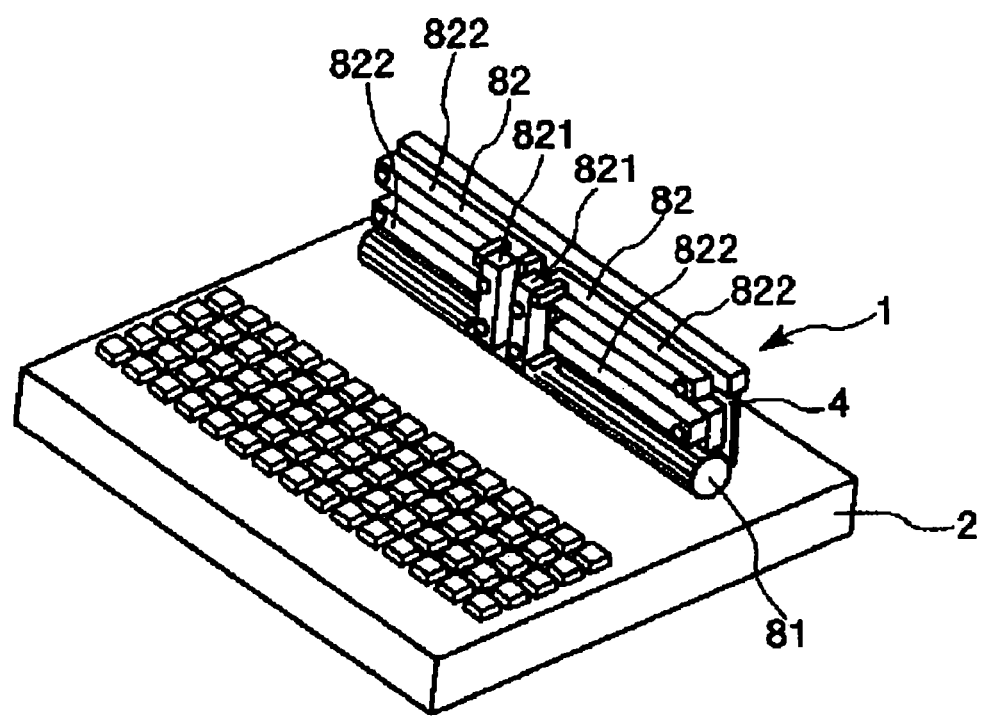
FIG. 24 is a schematic showing the function of the projection-type display device illustrated in FIG. 22.

FIG. 22 is a schematic showing an exemplary modification of the projection-type display device illustrated in FIGS. 16-18. FIGS. 23 and 24 are illustrations each showing a function of the projection-type display device illustrated in FIG. 22.

In the projection-type display device 1, the transmission-type screen 4 is composed of a sheet member having flexibility. Also, on the projector 2 are mounted an accommodating portion 81 and supporting portions 82. The accommodating portion 81 has the structure which enables the transmission-type screen 4 to be rewound and accommodated therein, and is placed on the upper face of the projector 2. The supporting portions 82 have the structure which enables the transmission-type screen 4 to be supported while keeping the screen 4 spread above the projector 2. The supporting portions 82 are composed of left and right ones used in a pair and placed on two opposed sides of the transmission-type screen 4 in a direction perpendicular to the direction in which the screen is rewound and parallel with a plane of the screen.

Specifically, each supporting portion 82 includes a pair of rods 822 joined together by a hinge 821; one ends of the pair of rods 822 are secured to corresponding end portions of the transmission-type screen 4 respectively. In regard to the supporting portions 82, each hinge 821 has a locking mechanism, which allows the paired rods 822 to be fixed while keeping the paired rods arrayed in a line. Then, each supporting portion 82 can make a rod member and support the transmission-type screen 4 while keeping the screen spread (see FIG. 22).

With the projection-type display device 1, the transmission-type screen 4 is rewound in the accommodating portion 81 thereby to be accommodated therein (to be brought into its accommodated condition) when it is out of use or being transported, or in front system projection (see FIG. 24). The keyboard portion of the display device 1 is exposed in this condition. Therefore, the display device 1 has a feature such that the keyboard can be operated even in front projection. In addition, the transmission-type screen 4 is withdrawn from the inside of the accommodating portion 81 and spread above the projector 2 (brought into its spread condition) in rear system projection (see FIGS. 22-24). In this situation, the transmission-type screen 4 is supported by the paired supporting portions 82 while being kept spread. Projection light from the projector 2 is guided by the mirror 3 and then projected onto the transmission-type screen 4 spread above the projector 2. Thus, a display image is formed on the transmission-type screen 4.

According to the projection-type display device 1, the transmission-type screen 4 includes a flexible member and as such, the screen can be spread when being used, and can be rewound when being out of use. In other words, the transmission-type screen 4 can be arbitrarily spread or accommodated depending on a situation where it is used. Since the transmission-type screen 4 is easy to spread and accommodate, the rear/front system projection can be switched easily.

In the projection-type display device 1, the transmission-type screen 4 is spread and rewound in an up and down direction (e.g. a vertical direction in the situation the projector 2 is placed on a desk) with respect to the projector 2. However, this isn't necessarily the best way. The projection-type display device 1 may be arranged so that the accommodating portion 81 is mounted with its lengthwise direction standing upright on the projector 2, and the transmission-type screen 4 is spread and accommodated in a left and right direction (i.e. a horizontal direction) with respect to the projector 2.

Further, in the projection-type display device 1, the accommodating portion 81 is mounted on the projector 2 and the transmission-type screen 4 is accommodated in the accommodating portion 81 on the projector 2. However, this isn't necessarily the best way. The projection-type display device 1 may be arranged so that the accommodating portion 81 and/or the pair of supporting portions 82 are/is removably mounted on the projector 2, and the transmission-type screen 4 can be detached together with the accommodating portion 81 and/or the pair of supporting portions 82.

It is preferable that a control unit (not shown) incorporated in the projection-type display device 1 automatically performs the above-described operations for folding and accommodating the transmission-type screen 4 and the mirror 3. However, such operations may be performed manually.

While in the above exemplary embodiments, the rear/front system projection is switched by folding, detaching, or accommodating the transmission-type screen 4, those aren't necessarily the best ways. The rear/front system projection may be switched by moving the transmission-type screen 4 in a predetermined direction.

Further, while the rear/front system projection is switched by detaching or accommodating the mirror 3 in the above-described exemplary embodiments, those aren't necessarily the best ways. The rear/front system projection may be switched by moving the mirror 3 in a predetermined direction.

While the projection-type display device 1 of exemplary embodiments of the invention have been described above based on the exemplary embodiments illustrated in the drawings, the invention is not limited to the exemplary embodiments. The arrangements of the parts in the exemplary embodiments may be replaced with arbitrary parts arranged so as to have like functions. Also, other parts arranged arbitrarily may be added to exemplary embodiments of the invention.

Exemplary embodiments of the invention may be a combination of any two or more arrangements (or features) of the above exemplary embodiments.

What is claimed is:

1. A transmission-type screen, comprising:
   a display plane;
   a backside layer;
   a front side layer formed on a light-output side of the backside layer; and
   a plurality of small reentrants and protrusions formed on a display plane side of the front side layer, at least part of the reentrants and protrusions are constituted of the same material,
   an image being displayed on the display plane when light is projected from a backside of the backside layer.

2. The transmission-type screen of claim 1, further comprising:
   a light-absorbing layer to absorb light provided on protrudent portions of the plurality of small reentrants and protrusions.

3. The transmission-type screen of claim 1, further comprising:
a light-absorbing layer to absorb light provided on inner side surfaces of the plurality of small reentrants and protrusions.

4. The transmission-type screen of claim 1, further comprising:
a light-diffusing portion provided on each of the reentrant portions of the plurality of reentrants and protrusions, the light-diffusing portion capable of diffusing light.

5. The transmission-type screen of claim 1, the plurality of reentrants and protrusions being formed by embossing.

6. The transmission-type screen of claim 1, further comprising:
an optical axis conversion layer to change a direction of an optical axis of a projection light which has penetrated the backside layer.

7. The transmission-type screen of claim 6, a direction of the optical axis after being changed by the optical axis conversion layer being substantially perpendicular to the display plane.

8. The transmission-type screen of claim 6, the optical axis conversion layer being composed of a hologram.

9. The transmission-type screen of claim 6, the optical axis conversion layer being composed of any one of a microprism, a Fresnel lens, and a plurality of optical waveguides.

10. The transmission-type screen of claim 1, the backside layer being composed of a microlouver.

11. The transmission-type screen of claim 1, further comprising:
a light-diffusing portion capable of diffusing light which has penetrated the backside layer.

12. A projection-type display device, comprising:
the transmission-type screen of claim 1.

13. A transmission-type screen, comprising:
a display plane;
a backside layer;
a front side layer formed on a light-output side of the backside layer; and
a plurality of small reentrants and protrusions formed on a display plane side of the front side layer,
an image being displayed on the display plane when light is projected from a backside of the backside layer;
an optical axis conversion layer to change a direction of an optical axis of a projection light which has penetrated the backside layer;
the backside layer and optical axis conversion layer being integrated into an optical waveguide composed of a plurality of optical waveguide elements, the optical waveguide having an inlet portion oriented toward the projected light and an outlet portion oriented toward the display plane.

14. The transmission-type screen of claim 13, the optical waveguide having a light-diffusing portion capable of diffusing light, and
the light-diffusing portion being formed by unevenly setting locations of leading ends of the plurality of optical waveguide elements.

* * * * *